(12) United States Patent
Moran

(10) Patent No.: US 7,203,962 B1
(45) Date of Patent: Apr. 10, 2007

(54) SYSTEM AND METHOD FOR USING TIMESTAMPS TO DETECT ATTACKS

(75) Inventor: Douglas B. Moran, Palo Alto, CA (US)

(73) Assignee: Symantec Corporation, Cupertino, CA (US)

( * ) Notice: Subject to any disclaimer, the term of this patent is extended or adjusted under 35 U.S.C. 154(b) by 847 days.

(21) Appl. No.: 09/654,347

(22) Filed: Aug. 30, 2000

Related U.S. Application Data

(60) Provisional application No. 60/151,531, filed on Aug. 30, 1999.

(51) Int. Cl.
*G06F 11/30* (2006.01)
*G06F 15/00* (2006.01)

(52) U.S. Cl. .......................................... 726/23; 726/25
(58) Field of Classification Search ................ 713/201, 713/502
See application file for complete search history.

(56) References Cited

U.S. PATENT DOCUMENTS

| | | | | |
|---|---|---|---|---|
| 5,471,631 A | * | 11/1995 | Beardsley et al. | 713/502 |
| 5,533,123 A | * | 7/1996 | Force et al. | 713/189 |
| 5,574,898 A | | 11/1996 | Leblang et al. | 395/601 |
| 5,621,889 A | | 4/1997 | Lermuzeaux et al. | 395/186 |
| 5,638,509 A | | 6/1997 | Dunphy et al. | 395/182.18 |
| 5,649,194 A | | 7/1997 | Miller et al. | 395/616 |
| 5,680,585 A | | 10/1997 | Bruell | 395/500 |
| 5,724,569 A | | 3/1998 | Andres | 395/602 |
| 5,757,913 A | | 5/1998 | Bellare et al. | 380/23 |
| 5,778,070 A | | 7/1998 | Mattison | 380/25 |
| 5,796,942 A | * | 8/1998 | Esbensen | 713/201 |
| 5,844,986 A | | 12/1998 | Davis | 380/4 |
| 5,978,791 A | | 11/1999 | Farber et al. | 707/2 |
| 6,170,063 B1 | * | 1/2001 | Golding | 713/502 |
| 6,321,338 B1 | | 11/2001 | Porras et al. | |
| 6,484,203 B1 | | 11/2002 | Porras et al. | |
| 6,704,874 B1 | * | 3/2004 | Porras et al. | 713/201 |

(Continued)

OTHER PUBLICATIONS

Roebuck, T., "Time Stamps and Timing in Audit-Based Digital Forensic Systems Examination", 2001, entire document, http://admin.usask.ca/~roebuck/time.HTML.*

(Continued)

*Primary Examiner*—Nasser Moazzami
*Assistant Examiner*—Ronald Baum
(74) *Attorney, Agent, or Firm*—Van Pelt, Yi & James LLP

(57) ABSTRACT

A system and method are disclosed for detecting intrusions in a host system on a network. The intrusion detection system comprises an analysis engine configured to use continuations and apply forward- and backward-chaining using rules. Also provided are sensors, which communicate with the analysis engine using a meta-protocol in which the data packet comprises a 4-tuple. A configuration discovery mechanism locates host system files and communicates the locations to the analysis engine. A file processing mechanism matches contents of a deleted file to a directory or filename, and a directory processing mechanism extracts deallocated directory entries from a directory, creating a partial ordering of the entries. A signature checking mechanism computes the signature of a file and compares it to previously computed signatures. A buffer overflow attack detector compares access times of commands and their associated files. The intrusion detection system further includes a mechanism for checking timestamps to identify and analyze forward and backward time steps in a log file.

14 Claims, 11 Drawing Sheets

U.S. PATENT DOCUMENTS 6,708,212 B2     3/2004     Porras et al.
6,711,615 B2     3/2004     Porras et al.

OTHER PUBLICATIONS

Rebecca Bace, Introduction to Intrusion Detection Assesment, no date, for System and Network Security Management.

Gene H. Kim and Eugene H. Spafford, Writing, Supporting and Evaluating Tripware: A Publically Available Security Tool, Mar. 12, 1994, Purdue Technical Report; Purdue University.

Douglas B. Moran et al., Derbi: Diagnosis, Explanation and Recovery From Break-Ins, no date, Artificial Intelligence Center SRI International.

Mabry Tyson, Ph.D., Explaining and Recovering From Computer Break-Ins, Jan. 12, 2001, SRI International.

Aleph One, Smashing the Stack for Fun and Profit, no date, vol. Seven, Issue Forty-Nine; File 14 of 16 of BugTraq, r00t, and Underground. Org.

Donald C. Latham, Department of Defense Trusted Computer System Evaluation Criteria, Dec. 1985, Department of Defense Standard.

James P. Anderson Co., Computer Security Threat Monitoring and Surveillance, Feb. 26, 1980, Contract 79F296400.

Teresa F. Hunt et al., A Real-Time Intrusion-Detection Expert System (IDES), Feb. 28, 1992, SRI International Project 6784.

Robert Durst, Terrence Champion, Brian Witten, Eric Miller, and Luigi Spagnuolo, *Testing and evaluating computer intrusion detection systems*. Jul. 1999 Communications of the ACM, at http://www.acm.org/pubs/contents/journals/cacm/1999-42-7/p53-durst/p53-durst.pdf.

Andrew H. Gross, *Analysing Computer Intrusions*, Ph.D. thesis, Electrical and Computer Engineering (Communication Theory and Systems), San Diego Supercomputer Center, University of California, San Diego, 1997.

Robert W. Baldwin, *Rule-Based Analysis of Computer Security*, Massachusetts Institute of Technology, Jun. 1987.

Dan Zerkle and Karl Levitt, *NetKuang—A Multi-Host Configuration Vulnerability Checker*, Proceedings of the Sixth USENIX Security Symposium, San Jose, CA, Jul. 1996.

Dan Farmer and Eugene H. Spafford; *The COPS Security Checker System*, Proceedings of the Summer 1990 USENIX Conference, Anaheim, CA: pp. 165-170. Jun. 1990; Coast TR 94-01; Jun. 1990. http://www.cerias.purdue.edu/homes/spaf/tech-reps993.ps.

Internet Security Systems; *Comparison between Internet Security Scanner (ISS) 1.x and Internet Scanner 3.2*, 1996. http://www.iss.net.

Internet Security Systems; *Technical Specifications for Internet Scanner Version 3.0*. [This document is undated—it is believed to be 1996 or earlier based on Item F which is version 3.2 of this document].

Samuel J. Leffler, Marshall Kirk McKusick, Michael J. Kaarels, and John S. Quarterman, *The Design and Implementation of the 4.3 BSD UNIX Operating System*, Addison-Wesley, 1989 Chapter 7 "The Filesystem".

Phillip A. Porras and Peter G. Neumann, Emerald: Event Monitoring Enabling Responses to Anomalous Live Disturbances, 1997 National Information Systems Security Conference.

Lawrence Halme, Teresa Lunt, and J. Van Horne, *Automated Analysis of Computer System Audit Trials for Security Purposes*. Proceedings of the National Computer Security Conference, Washington, D.C., 1986.

Teresa Lunt, *Automated Audit Trail Analysis and Intrusion Detection: A Survey*. Proceedings of the Eleventh National Computer Security Conference, Washington, D.C., Oct. 1988.

Teresa F. Lunt, Ann Tamaru, Fred Gilham, R. Jagannathan, Peter G. Neumann, Caveh Jalali, *IDES: A Progress Report*. Proceedings of the Sixth Annual Computer Security Applications Conference, Tucson, AZ, Dec. 1990.

David R. Safford, Douglas Lee Schales and David K. Hess, *The TAMU Security Package: An ongoing Response to Internet Intruders in an Academic Environment*. Proceedings of the Fourth USENIX Security Symposium, Oct. 1993, Santa Clara, CA.

Karen L. Myers, *A procedural knowledge approach to task-level control*, in Proceedings of the Third International Conference on AI Planning Systems, AAAI Press, 1996.

Michael P. Georgeff, Francois Felix Ingrand, *Real-Time Reasoning: The Monitoring and Control of Spacecraft Systems*, in Proceedings of the Sixth IEEE Conference on Artificial Intelligence Applications, 1990.

Michael P. Georgeff, Francois Felix Ingrand, *Decision-Making in an Embedded Reasoning System*, in Proceedings of IJCAI89, Detroit, MI, 1989.

Michael P. Georgeff, Amy L. Lansky, *Reactive reasoning and planning: an experiment with a mobile robot*, in Proceedings of AAAI87, 1987.

Michael P. Georgeff, Amy L. Lansky, *Procedural Knowledge*, in Proceedings of the IEEE Special Issue on Knowledge Representation, vol. 74, pp. 1383-1398, 1986.

Michael P. Georgeff, Amy L. Lansky, *A Procedural Logic*, in Proceedings of IJCAI85, Los Angeles, CA, 1985.

\* cited by examiner

SYSTEM AND METHOD FOR USING TIMESTAMPS TO DETECT ATTACKS

CROSS REFERENCE TO RELATED APPLICATIONS

This application claims priority to U.S. Provisional Patent Application No. 60/151,531 entitled "SYSTEM AND METHOD FOR PROVIDING COMPUTER SECURITY" filed Aug. 30, 1999, which is incorporated herein by reference for all purposes, and to U.S. patent application Ser. No. 09/615,697 entitled "SYSTEM AND METHOD FOR COMPUTER SECURITY" filed Jul. 14, 2000, which is incorporated herein by reference for all purposes.

This application is related to co-pending U.S. patent application Ser. No. 09/651,439 entitled SYSTEM AND METHOD FOR DETECTING COMPUTER INTRUSIONS filed concurrently herewith, which is incorporated herein by reference for all purposes; and co-pending U.S. patent application Ser. No. 09/651,303 entitled EXTENSIBLE INTRUSION DETECTION SYSTEM filed concurrently herewith, which is incorporated herein by reference for all purposes; and co-pending U.S. patent application Ser. No. 09/651,854 entitled SYSTEM AND METHOD FOR USING LOGIN CORRELATIONS TO DETECT INTRUSIONS filed concurrently herewith, which is incorporated herein by reference for all purposes; and co-pending U.S. patent application Ser. No. 09/651,434 entitled SYSTEM AND METHOD FOR USING SIGNATURES TO DETECT COMPUTER INTRUSIONS filed concurrently herewith, which is incorporated herein by reference for all purposes; and co-pending U.S. patent application Ser. No. 09/651,304 entitled SYSTEM AND METHOD FOR ANALYZING FILESYSTEMS TO DETECT INTRUSIONS filed concurrently herewith, which is incorporated herein by reference for all purposes; and co-pending U.S. patent application Ser. No. 09/651,306 entitled SYSTEM AND METHOD FOR DETECTING BUFFER OVERFLOW ATTACKS filed concurrently herewith, which is incorporated herein by reference for all purposes.

FIELD OF THE INVENTION

The present invention relates generally to computers and computer security. More specifically, a system and method for detecting computer intrusions is disclosed.

BACKGROUND OF THE INVENTION

Computers and networks of computers, such as local area networks (LAN) and wide area networks (WAN), are used by many businesses and other organizations to enable employees and other authorized users to access information, create and edit files, and communicate with one another, such as by e-mail, among other uses. Often, such networks are connected or are capable of being connected to computers that are not part of the network, such as by modem or via the Internet. In such cases, the network becomes vulnerable to attacks by unauthorized users, such as so-called computer "hackers", who may be able to gain unauthorized access to files stored on network computers by using ports or connections provided to connect that computer to computers outside of the network.

One known technique for foiling an attacker seeking to gain unauthorized access to a computer or computer network is a so-called "honey pot." A honey pot, in computer security parlance, is a computer system containing a set of files that are designed to lure a computer hacker or other attacker to access the files, such as by making it seem like the files are particularly important or interesting. Since the honey pot files are typically not actually working files, any activity in the honey pot files is suspicious and an attempt is made to identify and locate any user who accesses or attempts to access the files.

A second known approach is to provide a deception server. A deception server contains false data. A router or firewall is configured to route suspected attackers to the deception server instead of permitting the suspected attacker to access the real computer system or network.

An improved system and method for deception and monitoring of attackers is disclosed in co-pending U.S. patent application Ser. No. 09/615,967, referenced above.

However, absolute security is impractical, if not impossible, and the level of security implemented is based on a combination of risk analysis and cost-benefit analysis. New attacks are routinely discovered, and some of these may render a previous analysis and choice obsolete, often without the system administrator being aware of the change. Further, users of a computer system may inadvertently or deliberately introduce vulnerabilities. It is therefore essential to be prepared for successful attacks.

Identification and authentication systems, active network components such as firewalls, and intrusion detection systems are all examples of real-time computer security systems. Another class of systems includes forensic tools, which are used by a computer security expert to analyze what has happened on a compromised computer after a successful attack and may also be used to detect intrusions. Most of these tools, however, are of very limited use to most computer system administrators, who typically lack the knowledge to make effective use of such tools; i.e. knowing when to use them, how to operate them, and how to interpret the data produced.

The beginning of Intrusion Detection Systems (IDSes) for computer security is widely dated to a 1980 report by James P. Anderson entitled "Computer Security Threat Monitoring and Surveillance." An excellent summary of issues, trends, and systems can be found in the book "Intrusion Detection" by Rebecca Bace.

IDSes are categorized along three basic dimensions. The first dimension is the data sources used. Network-based IDSes capture packets from the network and examine the contents and the "envelope" for evidence that an attack is underway (packet capture is the network-equivalent of keystroke logging). Host-based IDSes examine information available within the host, and traditionally focus on one or more log files. On most platforms, the normal logging facilities do not provide either the quantity nor quality of information needed by the IDS, so they usually depend upon extensions, such as custom modifications to the operating system or the installation of optional packages such as audit logging for a TCSEC (Trusted Computer System Evaluation Criteria) C2 rating. An example of such a package is Sun's BSM (Basic Security Module) package. There are also hybrid systems.

The second dimension is the technology used: rule-based, statistical, or hybrid. "Signature-matching" IDSes are a major subgroup of rule-based IDSes that trade off having very limited rule systems against the ability to provide real-time monitoring of larger volumes of traffic. Statistical systems use a variety of approaches, from user modeling to knowledge discovery. An example of an IDS that is a hybrid network-based and host-based system as well as combining a rule-based and statistical approach is EMERALD, whose predecessors were IDES and NIDES.

The third dimension is real-time or after-the-fact. All conventional IDSes fall into the real-time category: their intention is to alert the operator to an attack so that he can respond in time to avert damage. However, the speed with which attacks are currently executed rarely allow time for any meaningful response from these systems. The after-the-fact category is dominated by forensic tools: utilities designed to help a computer security expert analyze what happened on a compromised host by extracting data that has been established as relevant to known attacks. The exception to this is the DERBI project (Diagnosis, Explanation and Recovery from Break-Ins), which experimented with the feasibility of after-the-fact detection of intrusions on hosts with no special data collection enabled. The DERBI project developed a loosely coupled system that processed data for a single known simulated host in an experimental testbed.

The existing systems, however, have many limitations: they fail to utilize many useful sources of data, they produce large amounts of information that are difficult for a human to analyze in a timely fashion, they are complex and difficult to use, and they are often designed for system administration rather than attack diagnosis.

There is a need, therefore, for an improved system and method for detecting computer intrusions, as will be described below with reference to the drawings.

SUMMARY OF THE INVENTION

Accordingly, a system and method for detecting computer intrusions are disclosed.

It should be appreciated that the present invention can be implemented in numerous ways, including as a process, an apparatus, a system, a device, a method, or a computer readable medium such as a computer readable storage medium or a computer network wherein program instructions are sent over optical or electronic communication links. Several inventive embodiments of the present invention are described below.

In one embodiment, an intrusion detection system comprises an analysis engine in communication with a source of rules and configured to use continuations. The analysis engine is configured to apply forward- and backward-chaining using rules from the source of rules. In a further embodiment, the set of rules from the rule source enable the inventive system to be used well after-the-fact of the intrusion: the rules configure the system to correlate and evaluate data from a range of data sources, combining information from primary, secondary, and other indirect sources to overcome problems created by missing and forged data. In a further embodiment, the rules configure the system to collect, correlate, and evaluate data related to all phases of an attack, enabling detection of attacks involving novel (unknown) components and attacks where all evidence of one or more components is missing.

In another embodiment, an intrusion detection system comprises an analysis engine and at least one sensor, wherein the at least one sensor and analysis engine are configured to communicate using one or more embodiments of a meta-protocol in which the data packet comprises a 4-tuple describing a data item. In a further embodiment, the 4-tuple comprises the semantic type, data type, data type size, and value for the data item. In a further embodiment, the analysis engine and sensors may be running on the same or different host, and instances of the same sensor may be run on multiple hosts to provide data to the analysis engine.

In another embodiment, an intrusion detection system comprises an analysis engine and a configuration discovery mechanism for locating system files on a host. The configuration discovery mechanism communicates the locations of these files to the analysis engine.

In another embodiment, an intrusion detection system comprises a file processing mechanism configured to match contents of a deleted file to a directory or a filename.

In another embodiment, an intrusion detection system comprises a directory processing mechanism configured to extract deallocated directory entries from a directory and create a partial ordering of the entries.

In another embodiment, an intrusion detection system comprises a signature checking mechanism configured to compute a signature of a file, compare it to a file signature previously computed by the signature checking mechanism, and compare it to a file signature previously computed by other than the signature checking mechanism. In a further embodiment, signatures for file are computed from archival sources (e.g., backup tapes).

In another embodiment, an intrusion detection system comprises a database of commands and files accessed by the commands, and a buffer overflow attack detector that is configured to compare an access time of a command with the access and modification times of files expected to be accessed by the command, wherein the database includes dependencies encoded using classes of objects.

In another embodiment, an intrusion detection system comprises a mechanism for checking timestamps, configured to identify backward and forward time steps in a log file, filter out expected time steps, correlate them with other events, and assign a suspicion value to a record associated with an event. In a further embodiment, the system compares the timestamps of a directory and its files and identifies values that are inconsistent or not accounted for, and assigns a suspicion value to the associated file or directory. In a further embodiment, directory and file timestamps from archival sources (e.g., backup tapes) are used to extend the data used in the assessment of the current state of the filesystem.

These and other features and advantages of the present invention will be presented in more detail in the following detailed description and the accompanying figures, which illustrate by way of example the principles of the invention.

DESCRIPTION OF THE INVENTION

Overview

A detailed description of a preferred embodiment of the invention is provided below. While the invention is described in conjunction with that preferred embodiment, it should be understood that the invention is not limited to any one embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Figure 1:
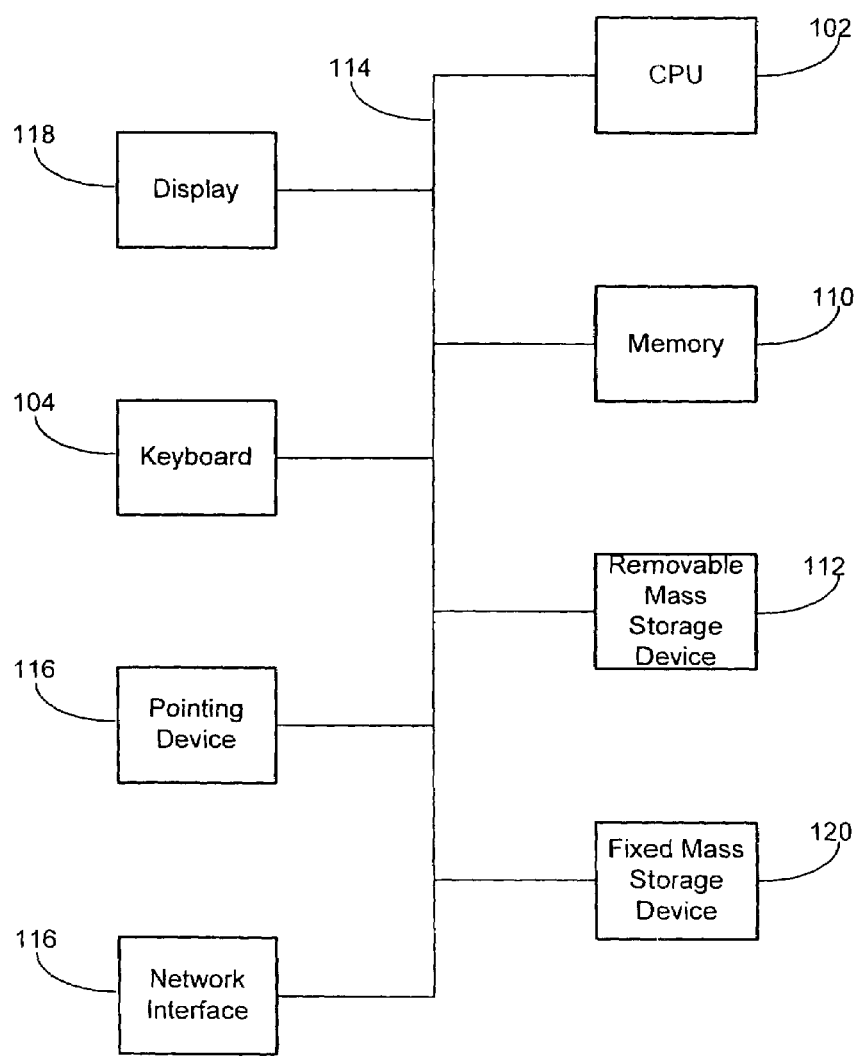
FIG. 1 is a block diagram of a general purpose computer system suitable for carrying out the processing in accordance with one embodiment of the present invention.

FIG. 1 is a block diagram of a general purpose computer system suitable for carrying out the processing in accordance with one embodiment of the present invention. FIG. 1 illustrates one embodiment of a general purpose computer system. Other computer system architectures and configurations can be used for carrying out the processing of the present invention. The computer system depicted in FIG. 1 is made up of various subsystems described below, and includes at least one microprocessor subsystem (also referred to as a central processing unit, or CPU) 102. That is, CPU 102 can be implemented by a single-chip processor or by multiple processors. CPU 102 is a general purpose digital processor which controls the operation of the computer system. Using instructions retrieved from memory 110, the CPU 102 controls the reception and manipulation of input data, and the output and display of data on output devices.

CPU 102 is coupled bidirectionally with memory 110 which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. It can also store programming instructions and data, in the form of data objects and text objects, in addition to other data and instructions for processes operating on CPU 102. Also as well known in the art, primary storage typically includes basic operating instructions, program code, data and objects used by the CPU 102 to perform its functions. Primary storage devices 110 may include any suitable computer-readable storage media, described below, depending on whether, for example, data access needs to be bidirectional or unidirectional. CPU 102 can also directly and very rapidly retrieve and store frequently needed data in a cache memory (not shown).

A removable mass storage device 112 provides additional data storage capacity for the computer system, and is coupled either bidirectionally or unidirectionally to CPU 102. For example, a specific removable mass storage device commonly known as a CD-ROM typically passes data unidirectionally to the CPU 102, whereas a floppy disk can pass data bidirectionally to the CPU 102. Storage 112 may also include computer-readable media such as magnetic tape, flash memory, signals embodied on a carrier wave, PC-CARDS, portable mass storage devices, holographic storage devices, and other storage devices. A fixed mass storage 120 can also provide additional data storage capacity. The most common example of mass storage 120 is a hard disk drive. Mass storage 112, 120 generally store additional programming instructions, data, and the like that typically are not in active use by the CPU 102. It will be appreciated that the information retained within mass storage 112, 120 may be incorporated, if needed, in standard fashion as part of primary storage 110 (e.g. RAM) as virtual memory.

In addition to providing CPU 102 access to storage subsystems, bus 114 can be used to provide access other subsystems and devices as well. In the described embodiment, these can include a display monitor 118, a network interface 116, a keyboard 104, and a pointing device 106, as well as an auxiliary input/output device interface, a sound card, speakers, and other subsystems as needed. The pointing device 106 may be a mouse, stylus, track ball, or tablet, and is useful for interacting with a graphical user interface.

The network interface 116 allows CPU 102 to be coupled to another computer, computer network, or telecommunications network using a network connection as shown. Through the network interface 116, it is contemplated that the CPU 102 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 102 can be used to connect the computer system to an external network and transfer data according to standard protocols. That is, method embodiments of the present invention may execute solely upon CPU 102, or may be performed across a network such as the Internet, intranet networks, or local area networks, in conjunction with a remote CPU that shares a portion of the processing. Additional mass storage devices (not shown) may also be connected to CPU 102 through network interface 116.

An auxiliary I/O device interface (not shown) can be used in conjunction with the computer system. The auxiliary I/O device interface can include general and customized interfaces that allow the CPU 102 to send and, more typically, receive data from other devices such as microphones, touch-sensitive displays, transducer card readers, tape readers, voice or handwriting recognizers, biometrics readers, cameras, portable mass storage devices, and other computers.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher-level code that may be executed using an interpreter.

The computer system shown in FIG. 1 is but an example of a computer system suitable for use with the invention. Other computer systems suitable for use with the invention may include additional or fewer subsystems. In addition, bus 114 is illustrative of any interconnection scheme serving to link the subsystems. Other computer architectures having different configurations of subsystems may also be utilized.

Figure 2:
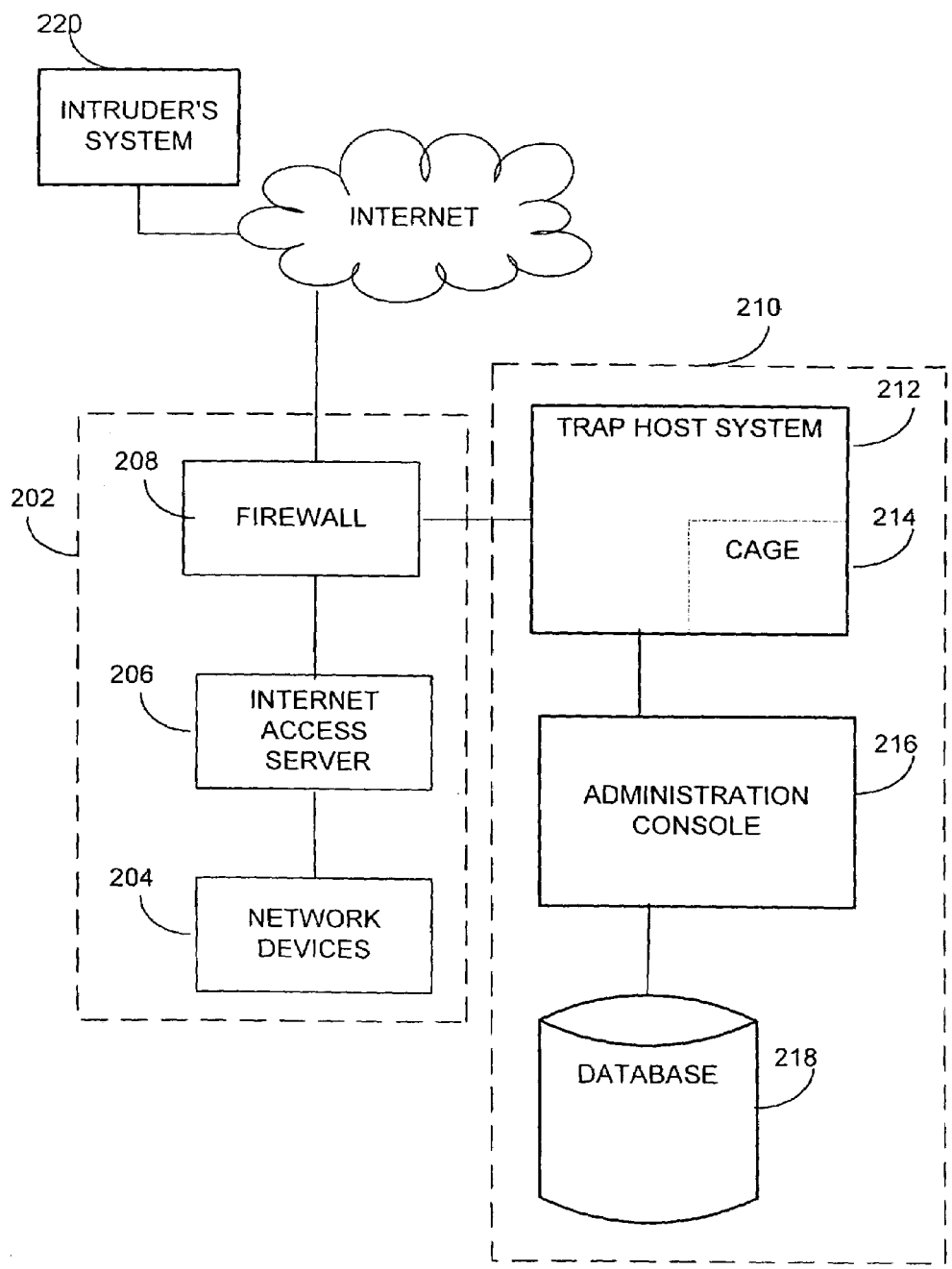
FIG. 2 is a schematic diagram of a system used in one embodiment to provide computer security.

FIG. 2 is a schematic diagram of a system used in one embodiment to provide computer security. The system includes a computer network 202 to which the operator of the computer network wishes to limit access to authorized users. Computer network 202 comprises a plurality of network devices 204. The plurality of network devices 204 may include, for example, individual computer work stations, network servers, printers, and any number of other devices such as may be found in a typical computer network, such as a local area network (LAN) or wide area network (WAN). Computer network 202 also includes a Internet access server 206 configured to enable users of host computer systems connected to the computer network 202 to access the Internet and in particular to access web pages via the World Wide Web by sending and receiving hypertext transfer protocol (HTTP) transmissions. Computer network 202 also includes a firewall 208 interposed between Internet access server 206 and the network connection to the Internet. Firewall 208 may be either a firewall, or a router with firewall functionality, configured to route authorized users to Internet access server 206 and to detect and route unauthorized users to the trap system described below.

The system shown in FIG. 2 also includes a trap system 210, comprising comprises a trap host system 212 in which a virtual cage 214 is established, as described in co-pending U.S. patent application Ser. No. 09/615,697. Trap system 210 also includes an administration console 216 connected to trap host system 212 and configured to enable a system administrator (or other authorized user) to control the configuration of trap host system 212 and virtual cage 214. Trap system 210 also includes a database 218 used to store data relating to activities within trap host system 212 and virtual cage 214.

The system shown in FIG. 2 is designed to protect the computer network 202 from being accessed or otherwise compromised by an intruder who is attempting to gain access to computer network 202 via the Internet. FIG. 2 shows an exemplary intruder's system 220 such as might be used by a would-be intruder to attempt to gain access to the computer network 202 via the Internet.

However, given enough time and resources, an intruder may compromise trap system 210, the internet access server 206, or an individual computer in network devices 204. On these and other systems, an intrusion detection system in accordance with the invention may be installed. In another embodiment of the inventive system, data collection modules may be installed on various host systems, and send information to another computer for analysis.

A computer security system in accordance with the invention comprises an intrusion detection system capable of reviewing data and identifying and characterizing intrusions after the fact. The inventive system is capable of handling events that are seconds, days, weeks, or longer ago. The system is configured to collects evidence about an attack and to organize that evidence into an assessment of the attacker's actions and possible intent.

Figure 3:
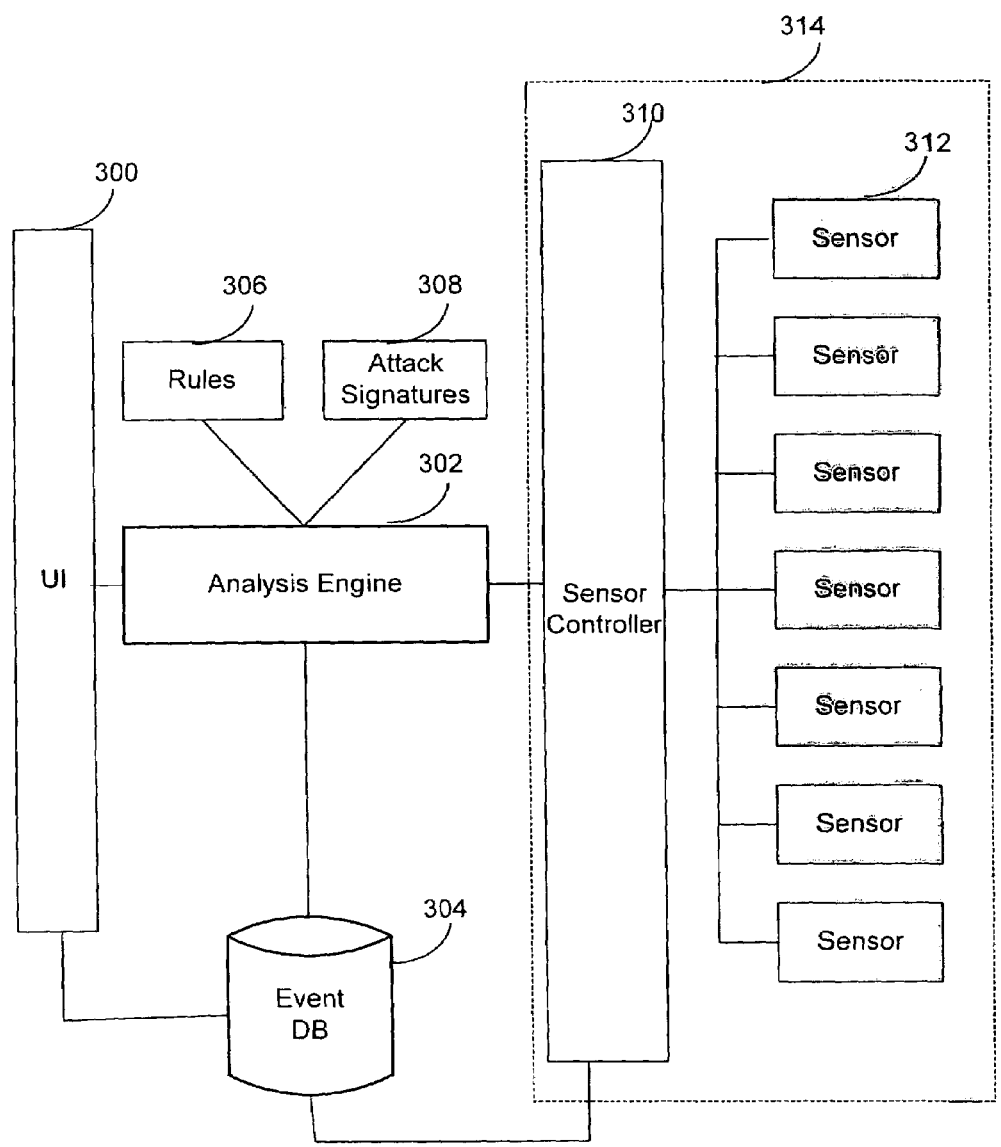
FIG. 3 is a schematic diagram showing the architecture of one embodiment of the invention.
Figure 4:
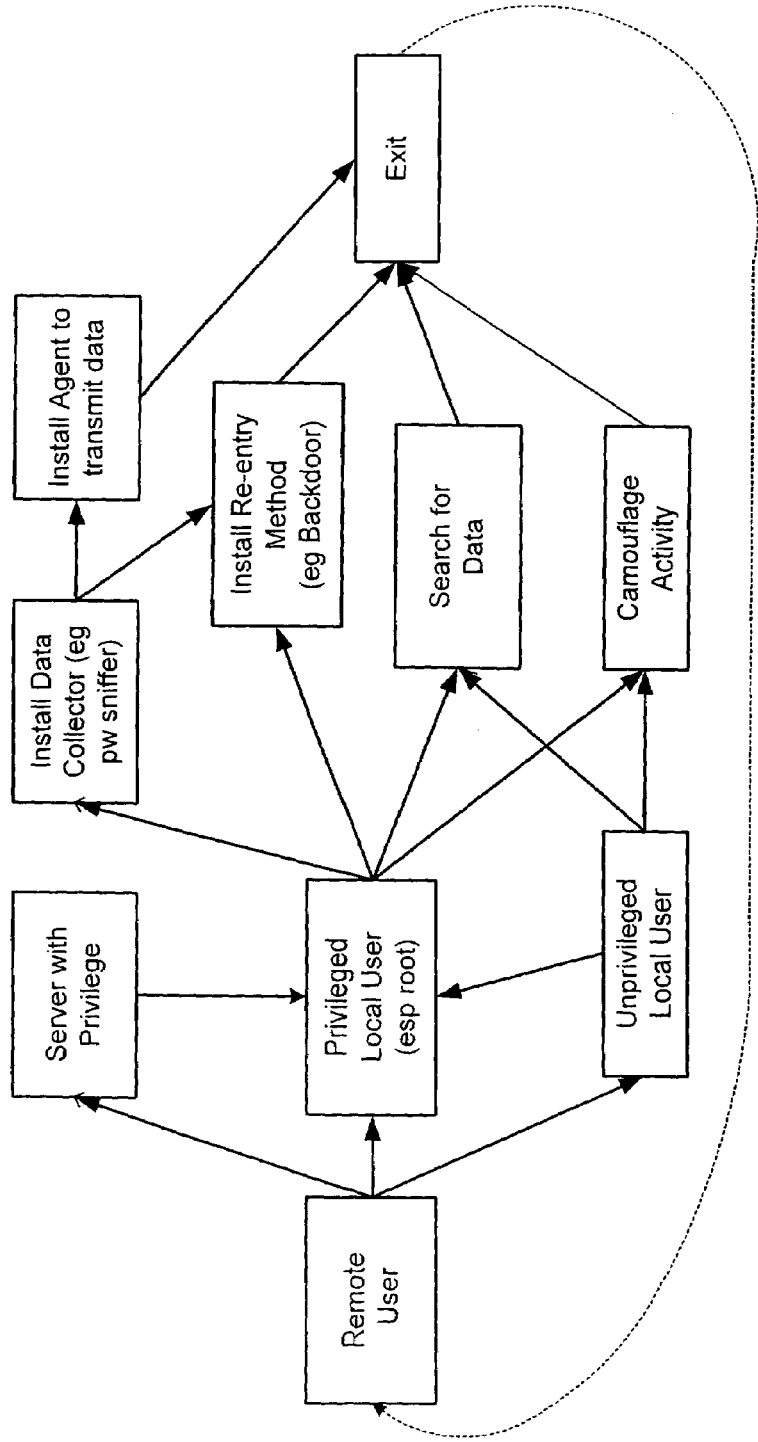
FIG. 4 is a flowchart illustrating a typical attack on a computer system.
Figure 5:
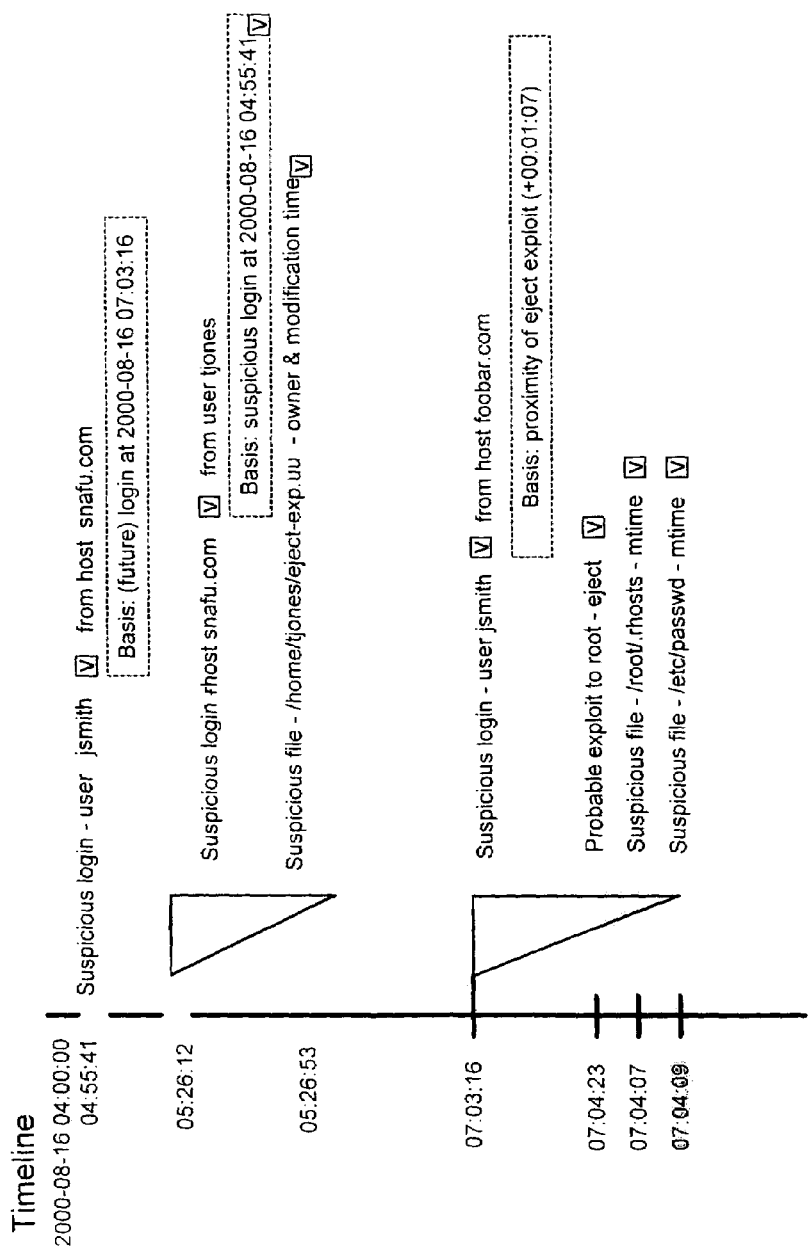
FIG. 5 is a schematic diagram illustrating an exemplary user interface in accordance with the invention.
Figure 6:
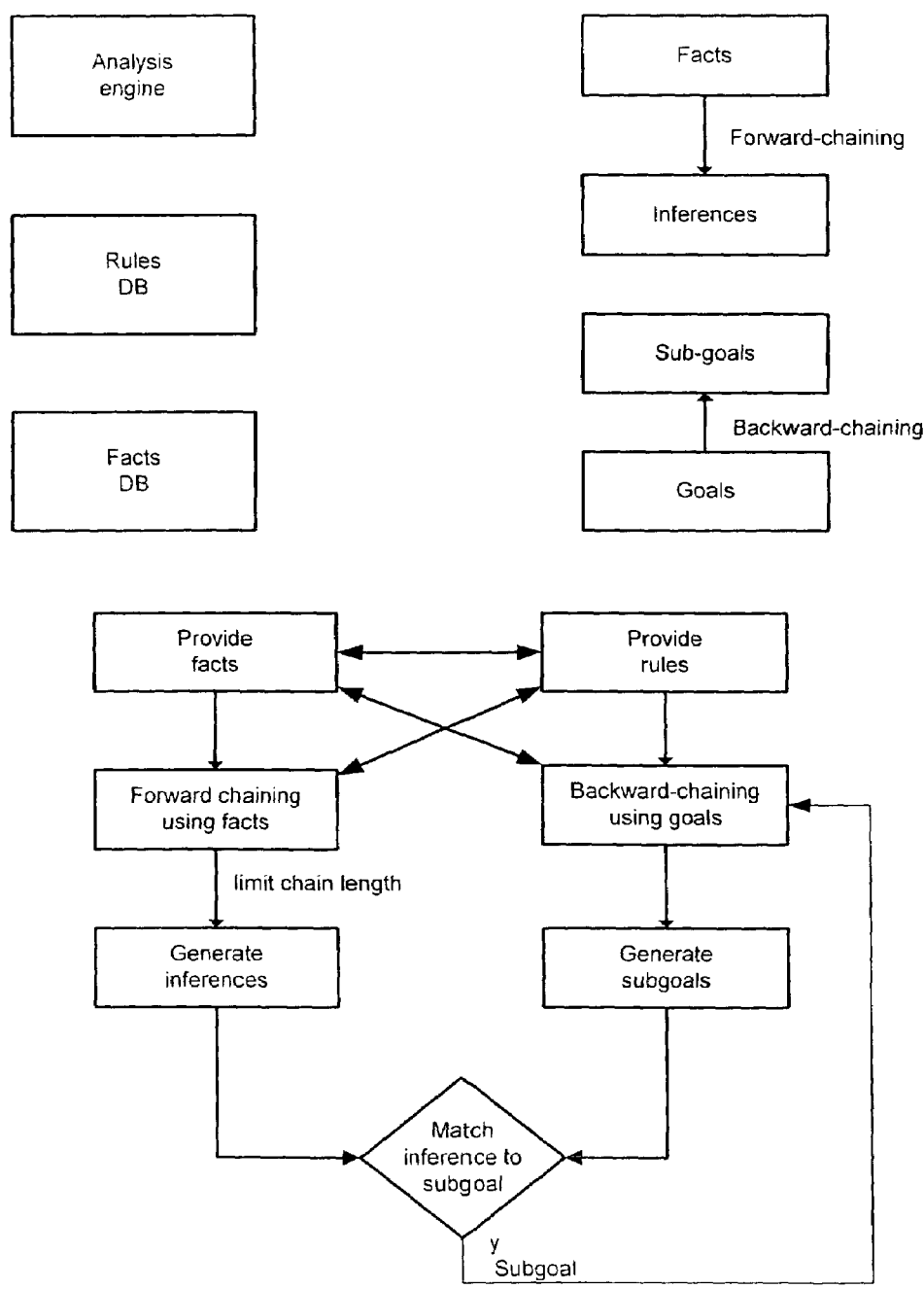
FIG. 6 is a flowchart illustrating an embodiment of the invention.
Figure 7:
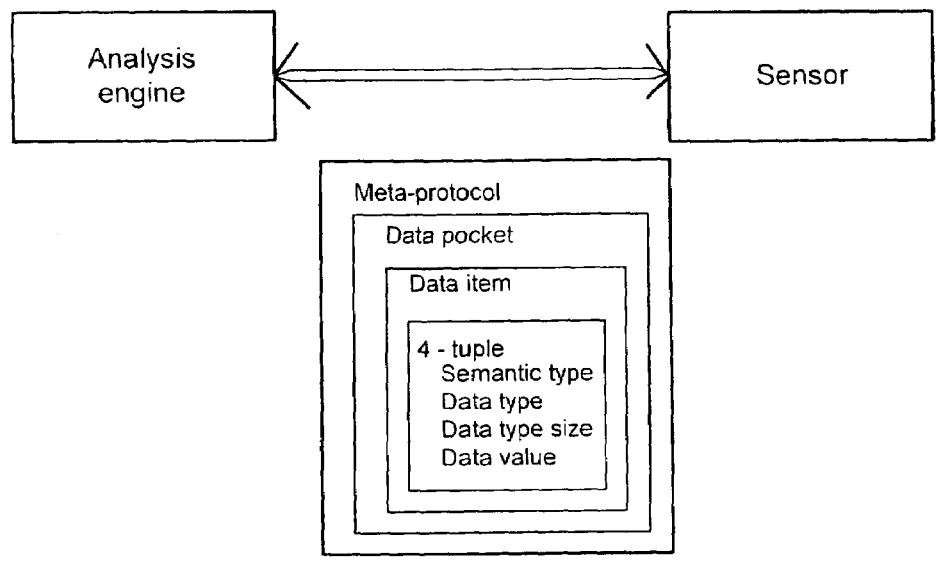
FIG. 7 is a flowchart illustrating an embodiment of the invention.
Figure 8:
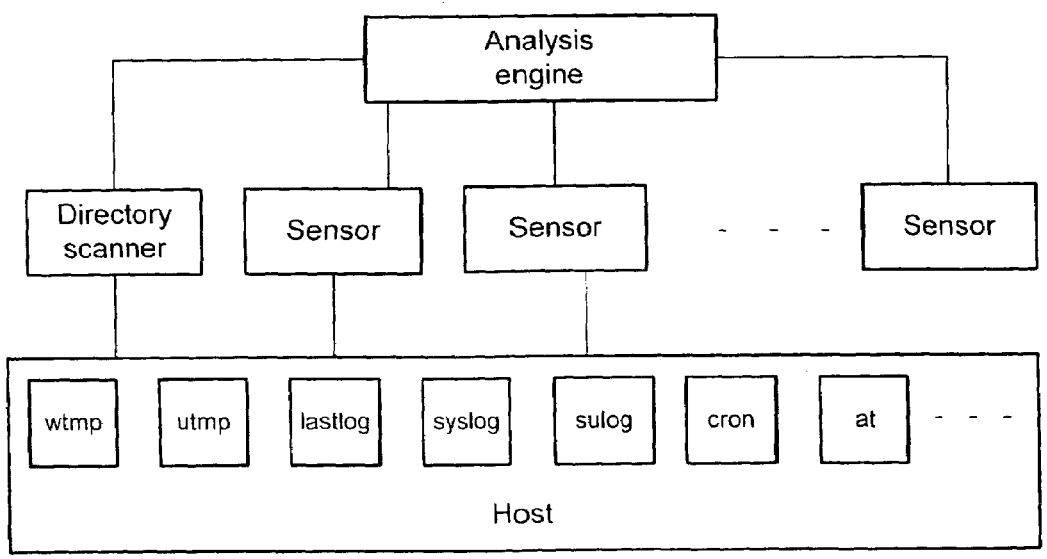
FIG. 8 is a flowchart illustrating an embodiment of the invention.
Figure 9:
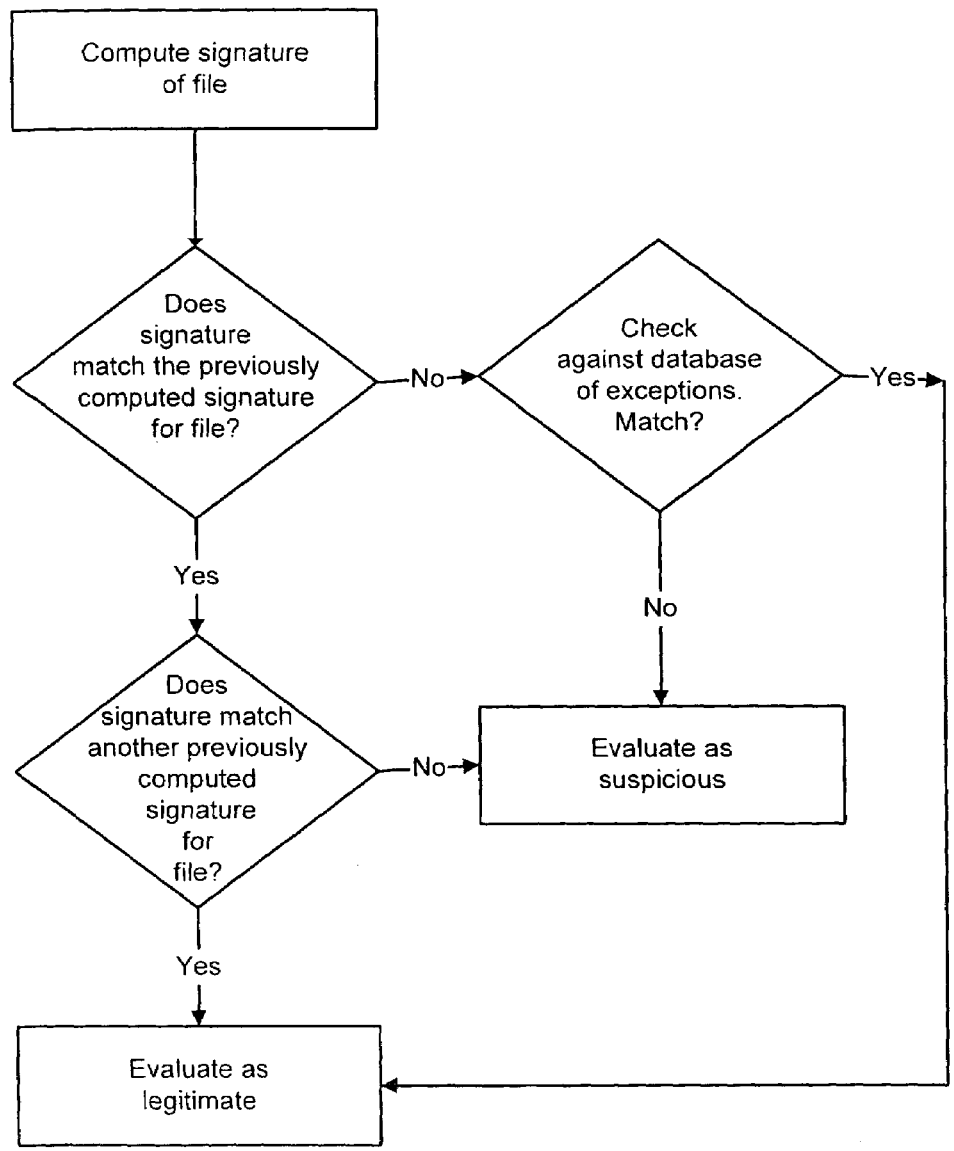
FIG. 9 is a flowchart illustrating an embodiment of the invention.
Figure 10:
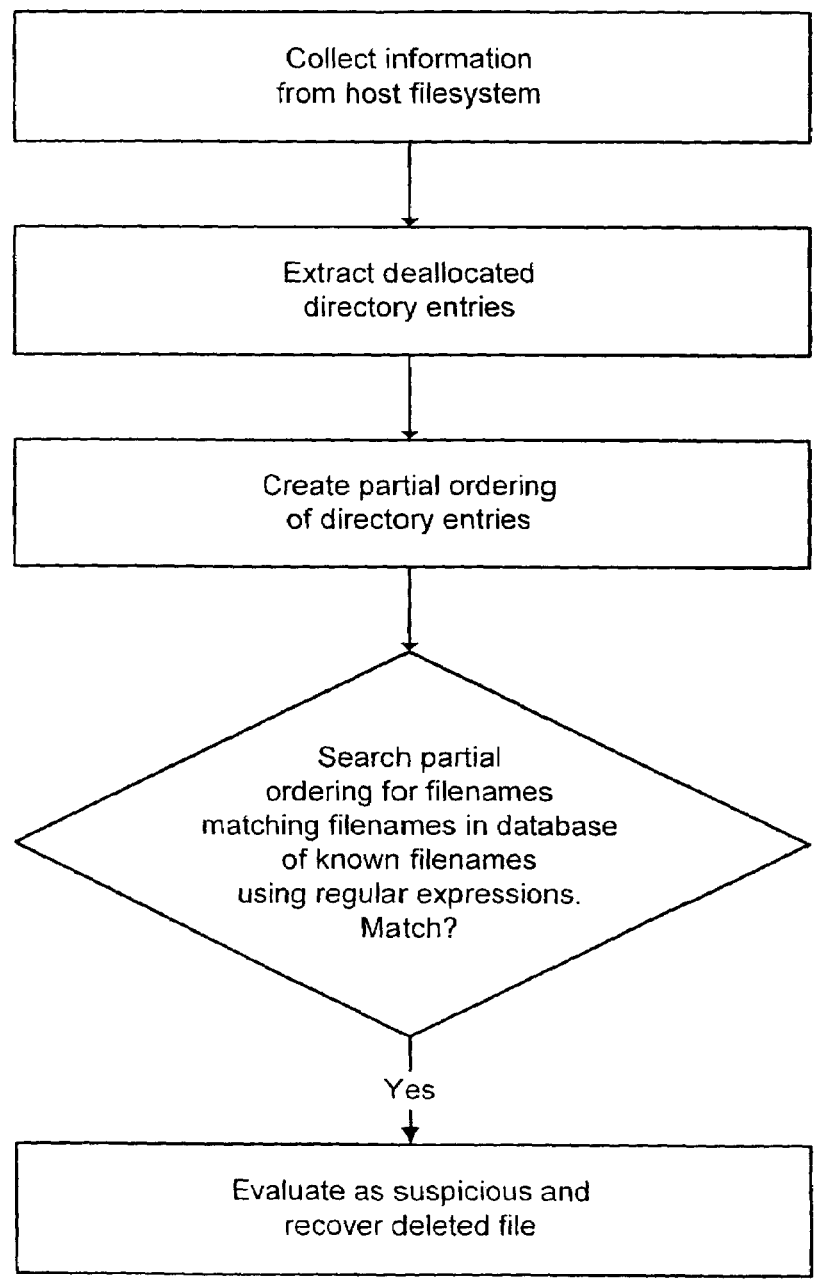
FIG. 10 is a flowchart illustrating an embodiment of the invention.
Figure 11:
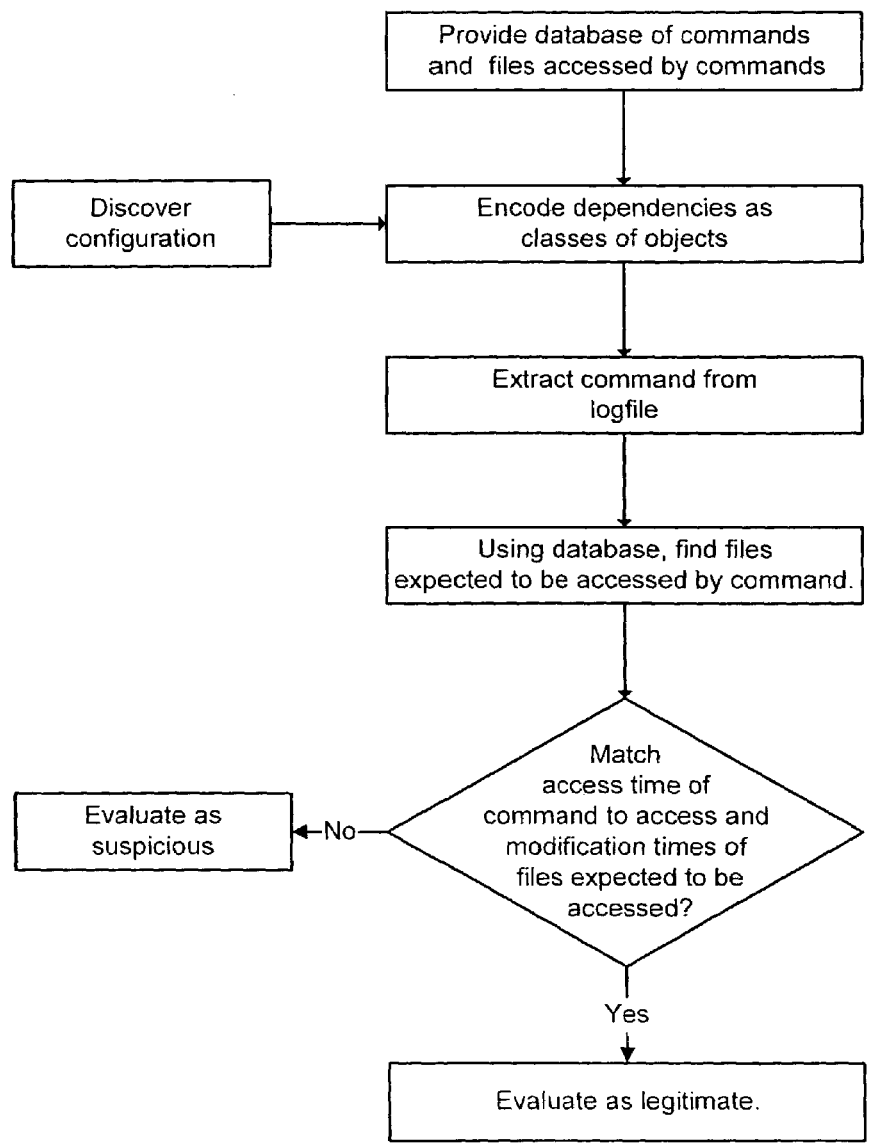
FIG. 11 is a flowchart illustrating an embodiment of the invention.
Figure 12:
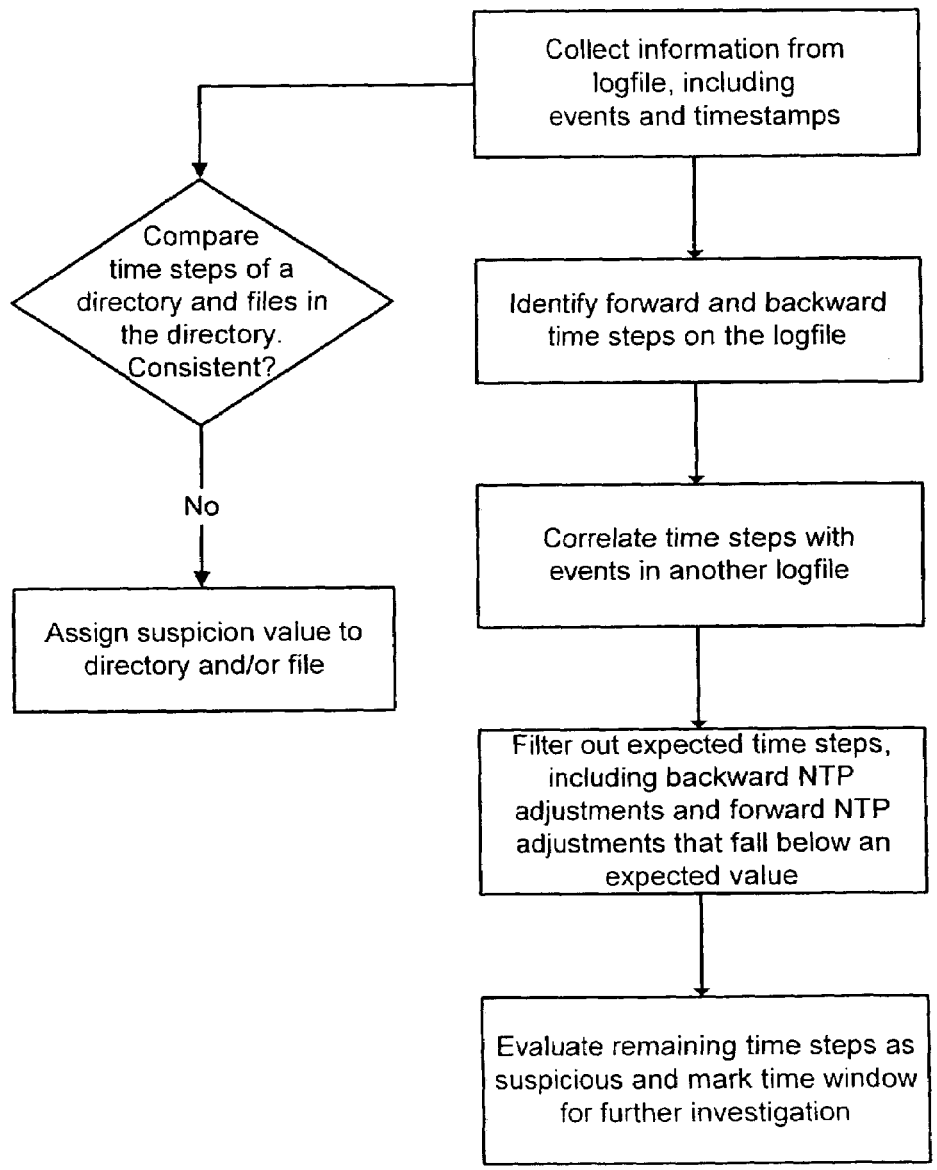
FIG. 12 is a flowchart illustrating an embodiment of the invention.

The architecture of an embodiment of the inventive intrusion detection system is shown in FIG. 3. A user interface 300 on a console (FIG. 4 shows an exemplary display on the user interface 300) provides the system administrator with access to the analysis engine 302 and event database 304. Analysis engine 302 utilizes ruleset 306 and an attack signatures database 308, and receives input from sensor controller 310. The sensor controller 310 is in communication with various sensors (in the form of data collection modules) 312, and may pass information to the event database 304. For efficiency and ease of use, the sensor controller 310 may be combined with the sensors 312 into a single program or process, as shown by dotted box 314, but the sensors 312 may individually or collectively be run independently of the sensor controller 310. Although the architecture has been presented in terms of a specific embodiment, one skilled in the art will recognize that the various elements shown may be combined in different ways, or further separated into other elements.

The inventive system may be used in conjunction with a larger real-time, network-based intrusion detection system (IDS), such as that described in co-pending U.S. patent application Ser. No. 09/615,967. In this configuration, the inventive system uses the network-based IDS as one of its sensors, and can be triggered to investigate further upon receiving a signal from the network-based IDS about suspicious events from other platforms (hosts, routers, and network monitors). The inventive system can be used to evaluate suspicious events in a larger context, and provide a response that the IDS uses in scoring the event to determine whether to issue an alert, and what level to assign it.

By combining the inventive system with the real-time IDS, the high false positive rate typical of the real-time systems is reduced by filtering out false alerts using a broader range of information than the IDS can retain, and by allowing the alert threshold to be set higher, because the inventive system can recover information about a suspicious session that occurred before the threshold was crossed. Further, in conjunction with the inventive system, the real-time IDS can monitor higher traffic rates, because it can now ignore certain classes of events that will be recovered by the inventive system.

The intrusion detection system of the invention may be configured to operate as a standalone to analyze a host after an intrusion has occurred. A significant number of intrusions are discovered only after the host has been used to attack other hosts, and it is not uncommon for the investigation of a host used to launch attacks on other hosts to reveal a series of other hosts that have also been compromised. A compromised host will often be used for many days to conduct automated attacks on other hosts, with the attacks being spread out ("stealthy", "in slow motion") to make them less salient to IDSes and other computer security systems. Manual track-back also typically takes hours, if not days, because there are significant delays in making contact and in transferring knowledge about the attacker's techniques. Attacks are often timed to occur during off-hours, to reduce the chance that there is someone present who might notice that something is amiss, and to increase the probability that there will be a substantial delay before any response is mounted to the attack. Thus, it is possible that the inventive system may not be applied to a compromised host until long after a successful attack has occurred.

By this time, much of the information available to conventional real-time systems is unavailable, because it was not retained, was overwritten in the course of legitimate use, or was modified or deleted by the attacker to conceal his presence. To offset the reduced amount of primary evidence available, the inventive system may search for secondary evidence of events and for evidence of the camouflaging of events. As suspicious items are discovered, they are used to narrow and prioritize the search for additional evidence. The search proceeds over multiple dimensions: time, user accounts, hosts involved, and known scripts.

Further, real-time systems are able to assume that the data they are operating on is accurate and complete within the expectations of the systems. For example, when a network-based IDS checks for forged source IP addresses, it assumes that it is using a faithful copy of the packet that was on the network and that the MAC address in the packet is correct. Similarly, a host-based IDS operating on audit log data (e.g., from Sun's Basic Security Module or similar C2 logger) assumes that it is receiving all records of the types requested and that those records have not been tampered with.

In analysis after the fact, however, the data present must be treated as suspect. The data may include forgeries planted by the attacker to mislead the analysis. Preferably, the inventive system deals with the unknown reliability of the data by examining redundant and related sources, and then checks for inconsistencies and supporting detail. The data is then scored on the basis of its consistency, difficulty of forgery, and likelihood of its being tampered with by an attacker (based on known and projected activity of current attackers).

Traditional IDSes are installed before the attack and are able to install or enable additional data collection capabilities. The signatures and other patterns used by traditional IDSes often critically depend upon data that is normally not collected by the system. For example, for a host-based IDS, the overwhelming majority of the SetUID (Set User Identifier) buffer overflow exploits can be detected by checking the audit records for the exec system call invoked with absurdly long arguments. An alternative is to monitor the effective User ID of processes for changes to privileged status that do not pass through the expected sequences. This approach is little used on operational hosts, because some platforms do not support it and on those that do, the various costs (computational, storage, maintenance) of using it typically greatly outweigh the expected benefits.

Because traditional IDSes can arrange for additional data collection, their designs focus on where they would get the best signature for an attack, and this typically is the exploit that gives the attacker additional privileges on the system (especially root privileges). However, this focusing has the consequence of failing to detect many novel attacks.

The system in accordance with the invention is preferably configured to assume that those additional data sources will not be present, but is able to utilize them if they are. The inventive system uses secondary and indirect information, and this expanded consideration of data sources occurs along two dimensions: (1) it uses multiple sources of data about the same event (although it is not unusual for there to be no usable information on an event, because it may not have been collected or it may have been deleted either maliciously or in normal course of operations); and (2) it identifies chains of events, inferring information about any potential "missing links." The pattern of a typical network-based attack is shown in FIG. 4. The inventive system has improved ability to catch attacks having novel components, because it is far less likely that all the components of the attack will be unknown to the system. For example, new exploits to gain root privilege are being discovered all the time, but the number of methods of installing and concealing a backdoor changes very slowly. Similarly, the methods for cleaning up log files and other evidence has changed very slowly over the years. Hacker "tradecraft" (modus operandi) produces atypical behaviors that are detected by the inventive system. For example, common tradecraft is to hide a directory by beginning its name with ".." (dot—dot) because it is not displayed in the normal listings of the parent directory. This and other patterns are easily identified by the system of the invention, as will be described herein.

The inventive system comprises data collection modules and an analysis engine. Preferably, the data collection modules are separate programs, allowing them to run on the compromised computer and optionally send the extracted information to another (hopefully uncompromised) computer for analysis. The data collection modules are designed to be lightweight and relatively simple, and different data sources are handled by different modules. These modules extract the data and add identifying information for the fields, simplifying the task for the analysis engine, which may have to deal with variants of the information from different platforms. Keeping the data collection modules lightweight and simple also simplifies the task of porting them to new platforms with differences in the data available and its format. This segmentation of functionality also makes it easy to extend the system, allowing both the addition of new data sources and the addition of rules on what evidence to collect and how to combine and interpret it.

The DERBI system referenced above looks for evidence of exploits, and the evidence of other components of attacks is limited to what can be collected by traditional configuration checkers. The system of the invention is able to utilize such evidence and data sources used by system administrators and others investigating and tracking attackers, in addition to additional data sources collected by the data collection modules. Some of these data sources have been examined using tools provided as part of the operating system, some have been examined using custom tools, and some are handled by scripts and ad hoc programs that never became widely available. Such tools are intended to reduce the level of effort needed to deal with individual data sources, by taking information collected for system administration and customizing it for various computer tasks. They extract data from system logs and other files, filter it, and display it to the system administrator. For example, some tools allow a system administrator to be alerted whenever an entry matching any of the patterns he has specified is written to a designated log file, thereby substantially reducing his need to manually check the log file. Other tools take alerts from multiple tools and funnel them to a common file or a "console."

The problem with many of the existing tools is that they were designed for system administration rather than attack diagnosis. For example, they silently skip malformed sections of various log and configuration files, while others ignore some of the fields and condense others, and thus may miss critical information. The inventive system has data collection tools that are capable of fully reporting the contents of the files.

The system administrator's main problem is not collecting the data, but turning it into useful information, due to the sheer volume of data. Finding evidence of the attack is often like looking for the proverbial needle in a haystack. Other evidence may be readily apparent, but difficult to interpret, because it require extensive knowledge of both the system and potential exploits. The invention provides for coordinated data collection capabilities, not only between data sources on the same system, but also over the wide variety of different platforms found in many computer clusters. This coordination of data enables the analysis engine of the invention to search for a wide variety of relationships, and to apply its built-in knowledge of general computer security and of specific attacks, producing a detailed assessment of one or more attacks. This simplifies the task of finding and assessing intrusions for the harried system administrator, who might fail to use existing tools even though he is aware of their existence and capabilities.

In an embodiment of the invention, the primary data source is the computer's filesystem, and multiple correlations are checked between files. Changes to system files and directories is a key component of many intrusions. Since system directories change infrequently and in largely predictable ways, attacks often leave a system directory in a state that is not only inconsistent with normal practice, but that is indicative of a particular class of attacks. This evidence is obtained by correlations between dates on the files and the directory, between dates on files and their relative order in the directory, and on dates of files relative to the information left in a directory when a file is deleted or removed.

The inventive system may also search the filesystem, including deleted entries, for filenames and filename patterns that are known parts of attacks, such as names that are part of attack scripts in circulation or use, and names that are part of the standard operating practice/modus operandi of attackers. Filesystem information, both timestamps and file signatures, may be recovered from backup dumps without having to reload the files and directories to disk. In an embodiment of the invention, the system supports the ufs-dump format, which is the most commonly used on a range of UNIX systems, and supports additional dump formats with data collection modules as needed.

Some of the programs most likely to be involved in an attack produce log entries for significant events. Some of these put related, often overlapping, information into different log files. There are commonly available hacker tools that help an attacker hide his tracks by deleting selected entries from these files, but these tools leave evidence of the deletion behind. Thus, the inventive system scans log files looking for evidence of an attack and for inconsistencies between the following:
  entries within each log file,
  related entries in different log files, and
  entries in the log file and information that is expected to be found within the filesystem (for example, between a user's login entries and his login start up files).

Configuration-checking is an important part of securing a computer, and there are multiple research systems available (COPS—Computerized Oracle and Password System, Texas A&M University's Tiger) and subsequent commercial versions. The intrusion detection system of the invention includes a variety of checks on the computer system's configuration, but because of different circumstances and goals, it may use that information differently from configuration-checkers. For example, a typical configuration checker will produce pages of warnings about a vendor's baseline operating system installation. Most of these are about sub-optimal configurations, such as a file owned by one privileged user account when it would better be owned by a different privileged account. Also, since configuration-checkers are intended to be run before an attack (although they are often helpful after an attack), the typical output is ordered by class of problem, and does not comment on dependencies between problems.

The inventive system focuses on discovering and presenting information about an attack, and presents configuration problems that are likely related to the attack, while suppressing those that aren't. Additionally, the presentation may show where relevant configuration problems fit within the factors that made the attack possible. This facilitates recovering from the attack, because the system administrator may be able to block future attacks of the same type by fixing only a subset of factors involved rather than having to fix every possible factor. It is also extremely useful in situations where one of the configuration problems cannot be changed due to its providing crucial functionality for the enterprise. For example, the restore command should normally not be set to allow execution by normal users with SetUID to root because it can be used to allow a normal user to install his own SetUID program on the computer that gives him a root shell. However, the dump-restore command pair have features that make them preferable in various circumstances to the other commonly available archiving and file copying utilities, and thus a system administrator may decide that having this capability available is worth the security risk. If the inventive system finds this vulnerability present, but finds that there are no suspicious SetUID commands and that the restore command was not used in the time window under consideration, it does not highlight this vulnerability.

Once an attacker has penetrated a computer, a common practice is for him to create a backdoor that allows him back onto the computer as a privileged user without having to repeat the exploit (especially useful if the operators have patched the vulnerability he exploited). One common class of attacks involves leaving a data collection program on the compromised computer, such as a password sniffer. If the operators find it, they often instrument the collection file and wait for the attacker to return to pick it up. The savvy attacker avoids reentering as a user unnecessarily. Instead, he creates a backdoor in a network service, or leaves behind an agent to periodically transfer the data to a "drop box." The intrusion detection system of the invention may be configured to check for a variety of backdoors, trap doors, Trojan horses, and other "leave-behinds."

The inventive system may includes knowledge about preconditions for, and indicators of, classes of attacks and for specific versions. For example, a common class of exploits involves subverting privileged programs. There are two primary classes of such programs: those that run by root (e.g., servers started at boot time), and "SetUID commands".

The latter are invoked by unprivileged users, but are executed with the access rights of a privileged user. They are used to provide users with controlled access to restricted resources. Exploits typically short-circuit the action of these programs, resulting in an inconsistency between the times associated with the command and the resources it is intended to control. Although such inconsistencies can arise from innocent uses, such inconsistencies have been shown to be excellent indicators of intrusions.

The system of the invention utilizes a variety of signatures of files, especially cryptographic signatures of system commands. Of those commands, the system may focus on the ones that are likely to be replaced by the attacker to provide a Trojan horse, backdoor or other agent. This information may be stored in a database to be utilized by the intrusion detection system.

When an attacker has penetrated a system, his actions in breaking through to get privileged access, camouflaging his presence and installing backdoors and other leave-behinds, he is often behaving as a cross between an advanced software developer and a busy system administrator. Many of the high-value targets (for both the attacker and the defender) are stable platforms: there is infrequent installation of new software, and system administration is usually routine housekeeping. Hence, the evidence provided by dates on the files, programs, and libraries touched during the intrusion can persist for a long time.

In one embodiment of the invention, the inventive system may collect all available evidence and perform its analysis on the evidence. In another embodiment, the data collection and analysis may be data-driven. In this embodiment, the evidence already collected determines what additional evidence will be sought. Analysis by the intrusion detection system can be initiated by a wide range of conditions, such as a routine scheduled audit, a report from a local user that the computer is not behaving as expected, a report from another host that an attack was launched from a local host being monitored by the inventive system at time T, or a report from a real-time intrusion detection system such as that in co-pending U.S. patent application Ser. No. 09/615,967.

In an embodiment of the invention, the analysis engine uses a declarative knowledge base. The specifications of what to look for are provided in a human-oriented format, then transformed and compiled into rules that allow the inventive system to respond efficiently to pieces of evidence as they arrive. Because some of the evidence of an attack will likely have been lost before the analysis engine is run, the specification of how to interpret evidence assigns four weights to each piece of evidence:

1. Likelihood that the underlying event is part of the larger sequence (e.g., is it a critical component, one of several alternatives, or something that routinely occurs).
2. Likelihood of finding the evidence.
3. Likelihood that the underlying event indicates that the larger sequence did not occur (i.e., it is contrary evidence).
4. Severity (cost of recovery/damage).

These weights are very similar to probabilities, but are not termed "probabilities" here because the assignment of values to the base evidence is an educated guess (due to the lack of a dataset that could be used to generate realistic probabilities) and because there are some exceptions in the combination rules. For example, under normal probability, a sequence of two independent events each with a probability of 1% would have a probability of 0.01%, but a combination of two events with weights of 1 can be assigned a weight of 1, thereby avoiding the problems related to unwarranted precision and the problems related to improbable events being transformed into impossible events by round-off.

As evidence is combined, the first and third weights are key to guiding the course of the analysis: the analysis engine focuses on scenarios that are likely (good evidence for) and plausible (little evidence against), and prioritizes collecting evidence that could support or argue against that scenario. The fourth (seriousness) provides proportional weight of competing scenarios. The second weight is most used at the lowest levels of evidence, and its value tends to merge into the first and third as evidence is combined.

A critical complication in the collection of evidence is that the collection process for one type of data can overwrite other data. The inventive system contains specifications of these relationships and reorders the collection process to minimize unnecessary loss. For example, if the collection of requested data would overwrite another data source that has not yet been requested, the inventive system either invokes immediate collection of that second data set, or deprioritizes collection of the first and places collection of the second earlier in the queue. This decision is based upon the cost of collecting the second data set (e.g., if cheap, do it now) and on the priority assigned to collecting the first (e.g., if low priority, defer it further).

DETAILED DESCRIPTION

Messaging and Extensibility

In an embodiment of the invention, a wide range of data sources is used. To facilitate this, the inventive system's architecture comprises a set of mechanisms that allow additional data sources to be incorporated into the system. This set of mechanisms includes the following:

an extensible family of communications protocol, based upon a meta-protocol;

a declarative rule set to provide the analysis engine with a specification of the sensor for a data source. The rule set for a new sensor can be loaded into an already running analysis engine, which can then immediately start to utilize that sensor; and a declarative rule set specifying the interactions of the data from the new data source with that from other sources. Such rule sets can be incrementally added to an already running analysis engine. Rules that reference data sources not currently available to a particular analysis engine may be silently ignored (as moot).

Meta-Protocol for Communication Between Sensors and the Analysis Engine

The system of the invention may be configured to operate with various computing platforms, singly and in combination. However, similar data sources on related platforms have small but critical variability, such as different subsets of the data fields and different data representations. For example, the UNIX uid_t (user id) data-type may change from a 16-bit integer to a 32-bit integer across platforms. On some platforms, it is a signed value, and on others, it is an unsigned value (i.e., non-negative). Some hardware architectures are little-endian (e.g., Intel x86), while others are big-endian (e.g., SPARC). Some use 32-bit words and others use 64-bit words.

Basic structure: in the meta-protocol for communications between sensors and the analysis engine, the basic levels of abstraction are as follows:

1) A Session Comprises
   a) a "bootstrapping" prefix that identifies which implementation of the meta-protocol is being used and its parameters, as described below.
   b) a sequence of messages 2) A Message Comprises
   a) a header
   b) an unordered collection of data-items 3) A Data-Item is a 4-Tuple, Comprising
   a) a semantic type
   b) a data type, such as a character string, signed NBO (Network Byte Order) integer, unsigned NBO integer, etc.

c) a data size, in units appropriate for the data-type, with the assignment specified during the session's bootstrapping section.

d) a value, in the form specified by data-type and data-size

Data Items

Subsets of the 4-tuple may be used, such as a 2-tuple<data-type-and-size, value>. An example of this approach is the eXternal Data Representation (XDR) of the Open Network Computing (ONC) package from Sun. XDR is used in Sun's RPC (remote procedure call) on top of which a number of services are built, including Sun's Network File System (NFS) and Network Information name Service (NIS). In these approaches, the semantic type is implicit: it is specified by its position in the data structure, and that specification is embedded not in the data structure, but in the programs that create the data and programs that use the data.

This approach requires that when the data structure changes, the user must make a coordinated update of all programs that create and use the data structure, and any existing saved data structures must be converted to the new format in order to use them with the updated program. Furthermore, this approach makes inefficient use of storage when the data structure tends to be sparsely populated with data, such as when many of the fields are optional). One scheme under this approach is to convert all members of a family of data types into a single base type in the data structure. For example, on a machine architecture with 32-bit words, all smaller integer types (8-bit and 16-bit) are converted to 32-bit integers. The programs that store and retrieve this data item convert between this base type and the intended member of the family. However, this scheme may cause problems when exchanging data between platforms where the base types are not the same, such as between a platform with 32-bit integers and one with 64-bit integers.

Another scheme is to have a separate identifier for each member of the family. Typically, the values used for these identifiers follow a simple pattern, but that pattern is not part of the API specification, so programmers using the API cannot safely exploit that pattern. Note: if the pattern is part of the API, then the scheme has effectively separated the data-type from the data-size.

These approaches typically fail to exploit regularity in families of data types, and can fail to handle new members of a family or new platforms that extend a family. Another large family of such approaches uses the 2-tuple <semantic-type, value> where the data-type and data-size are implicit in the definition of semantic-type. This is a reasonable simplification when the system architect has control of the data structures, such as when an application is being designed "from scratch." However, when the data types and data sizes are dependent on some external changeable specification, this scheme has limitations similar to the first approach: changes in the underlying data structures require coordinated changes to all components using those data structures and coordinated conversion of data sets from the old form to the new.

Type conversion: In accordance with the invention, a scheme for type conversion is provided in the meta-protocol for the system. Consider an example based upon the change in the uid_t data-type (as described above) in which all hosts are 32-bit architectures, with the analysis engine on host A and data coming from hosts X and Y. Host X is a platform that represents the uid_t data-type as a signed 32-bit integer, and host Y is a platform that represents it as an unsigned 32-bit integer. The basic UID (User ID) assignment used non-negative integers starting at zero. This basic scheme was extended to include the special user nobody (and later, some additional variants). These special users needed to be assigned the same UID on all hosts within a cluster, and the suggested (default) assignment was one that would have the same bit representation on the largest group of platforms: 65535 where uid_t was an unsigned 16-bit integer (the maximum value), −1 where it was a signed 16-bit integer (the twos-complement of 65535), and 65535 where it was a 32-bit integer (signed or unsigned). Although implicit/hidden type coercions are a common trick used by application developers to provide interoperability between disparate platforms and releases of the application, these coercions are also potential sources of vulnerabilities. Notice that in this example that the 16-bit value of −1 that has been converted to a 32-bit integer via sign-extension is not bit-equivalent to a 32-bit value of 65535. Next, notice that the equivalence of −1 and 65535 as 16-bit integers is critically dependent on the use of twos-complement for negation. While the twos-complement for negation is all but universal, there are exceptions.

Passing these values as a 4-tuple allows the analysis engine of the invention to reason about interactions. By explicitly performing the type conversions, it can identify vulnerabilities introduced by incorrect assumptions about the conversion and by the conversion process. The disclosed meta-protocol of the invention provides increased efficiency in encoding and decoding data items, efficiency in storage space utilization, and flexibility to accommodate extension to additional platforms. This minimizes the need for changes to the deployed components when a new platform is included in the cluster of hosts being supported.

Encoding/Decoding Efficiency: When a component inserts a data item into a message, it uses the natural data type for that platform, and the recipient of the message converts the data item to a form appropriate to its platform. Because of the pattern of computer acquisition and management, it will be very common for the sender and recipient to be hosts with the same hardware architecture (e.g., Intel x86), and thus they can use the data values without conversion. Contrast this with the case where two 32-bit little-endian hosts were forced to convert data to and from 64-bit big-endian representation because such a platform was a potential member of the exchange, even if that platform did not actually exchange data with the 32-bit little-endian hosts.

Storage Space Efficiency: The system of the invention collects large amounts of data from a range of sensors. By not converting all values to the largest member of its family of data-types (e.g., converting 16-bit integers to 64-bit values), the system saves substantial amounts of storage and communication bandwidth.

Extension: Efficient handling of integers is obtained by combining this representation with bignum technology. Bignum (Big Number) technology provides for representation of arbitrarily large integers (multi-precision integers). In most implementations of bignums, there is little or no performance penalty for numbers that do not need extended precision. Continuing the above example, the analysis engine running on host A uses signed 32-bit integers for UIDs from the reporting machines. Now, add a third host Z on which UIDs are 32-bit unsigned integers and have it include a UID greater than 2147483647 ($2^{31}-1$, the maximum value for a signed 32-bit integer). At this point, the analysis engine needs to use a bignum for this particular value—the other values continue to use the native integer data-type.

In an embodiment of the invention, the data-type and the data-size are combined into a single integer value for efficiency of transmission and processing. There are two major data types of interest to this application: strings and integers. Floating point numbers have not been encountered in any relevant data structure, and pointers are a subcase of integers. The basic data type is encoded in the high-order bit of the integer: 0 for strings, 1 for integers. This enables a trivial test to distinguish the two types: integers have a data-type-and-size that is negative, strings have one that is non-negative. For strings, the remainder of the code is the length of the string in bytes. For integers, there are two subcases: signed and unsigned, and this is marked by the next-to-highest-order bit (1 marks unsigned). The remainder of the code is the size of the integer, either in bits or bytes. Because all the architectures of interest use integers whose sizes are multiples of bytes, we currently use bytes as the unit for integer size. This has the advantage of allowing unified treatment of the length of both strings and integers. Zero was chosen as the bit value for the string data-type because it allows the value to be used directly as a length code—the length codes for integers tend to be used as selectors (a branch or case) rather than as lengths.

Most semantic types can be treated as distinct items, that is, the semantic type is a single feature, not a set of features. The primary exception are semantic types that involve time. Different platforms use different encodings of time. For example, UNIX platforms keep time as the number of seconds from 1970-01-01 00:00:00 UTC (Universal Coordinated Time), while MacOS uses 1904-01-01 00:00:00 UTC. Semantic types that are a combination of features are assigned integer values where bit fields are allocated to the different features, allow the algorithms to exploit these patterns.

One embodiment of the invention may have sensors report time in the scheme native to their platform, with the analysis engine responsible for performing any needed conversions, and conversions can be deferred until required. For example, if all the hosts being analyzed use the same time scheme, the analysis engine can perform its comparisons on those raw times without doing any conversions, even if the analysis engine is running on a platform that uses a different time scheme. The analysis engine stores times with a tag indicating what scheme has been used so that it knows when conversions are needed.

A related issue with time reports is that of granularity. In UNIX, the default granularity is seconds (time_t), but some log files record time in human-readable form at a granularity of only minutes, and some events are recorded with higher precision by using a structure in which the first element is in seconds (time_t) and the second element encodes the sub-interval, either microseconds (struct timeval) or nanoseconds (struct timespec). This granularity is encoded into the semantic type as a bit-field, paralleling the encoding of the time-origin.

Messages

The next level of abstraction in the meta-protocol is the message, which is composed of a header and an unordered collection of data-items. Different platforms have different sets of values, for example, the UNIX filesystem records three time values for each file: last-access time, last-modification time, and last-change time (where change is traditionally defined to be either a modification to the file's contents or a change to its properties). Other types of filesystems record subsets of these, such as the last-modification time only. Sensors report only the data that they can extract, and do not send values encoding unavailable, nor do they try to extrapolate values. Because the analysis engine looks for subtle inconsistencies, extrapolation carries substantial risk of misleading the analysis process. Distinguished values for unavailable are often not practical, because the designers of the platforms where that data is available typically did not reserve any values for this purpose, and even where there are reserved or unused values that can be usurped for this purpose, it is highly unlikely that the same value will be available across all platforms where it is needed. Unavailable/undefined values are assigned by the analysis engine based on the features of the database being used.

Since the analysis engine has to deal with different subsets of values in messages from corresponding sensor on different platforms, there is limited value to requiring a relative order between the data items present. The advantage of having no ordering requirements is that it can simplify the algorithms in the sensors for extracting the required information by allowing them to retrieve that information in the order that is natural for each specific platform. In an embodiment of the invention, the system imposes no ordering restriction, relying entirely on the semantic types to identify the data items. This means that a message cannot contain two data items with the same semantic type, except where they are an unordered list (a set) of such items. Semantic information that, in another scheme, would be implicit in the relative positions of two data items must be explicitly encoded in the semantic type of data items in this scheme. In other representation schemes, multiple items of the same semantic type are subcategorized by their absolute or relative positions.

Message Header: The message header preferably comprises a) a timestamp (optional), b) sequence number to enable detection of missing and duplicate messages and the insertion of false messages (for example, by the attacker), c) implementation specific fields related to construction of the message, such as its total length (in bytes) and the number of data items in the body, d) a message identifier that provides context for interpreting the body of the message:

i) Sensor family identifier. Sensors performing similar functions on different platforms are grouped into a family.

ii) Sensor message type identifier. For example, for a sensor processing a log file, some of these type IDs are (1) log entry parsed into fields, which are the data items in the body of the message (2) a malformed entry has been found (3) an execution error in the sensor (for example, an attempt to read the next line in the file returned an error/exception from the OS).

iii) Session identifier. This is an index to a data structure specifying the conditions for this particular invocation of this sensor. This data structure includes the host that the sensor collected data from and the options specified for this invocation.

In alternative embodiments, the analysis engine may rigorously segregate the input from each sensor, allowing the sensor family identifier and the session identifier to be omitted from the message, with the corresponding information added by the analysis engine as it incorporates the contents of the message into its database.

Sessions

The next level of abstraction in the meta-protocol is the session, which is comprises initial bootstrapping section followed by a sequence of messages. The first message in the bootstrapping section is a code that identifies which implementation of the meta-protocol is being used. This specifies the format of the remainder of the bootstrapping section and the general format of the messages. Subsequent entries in the bootstrapping section provide parameters for the messages. For example, they may specify byte sizes for the values encoding semantic type, data type, and data size, specify the format of the timestamp in the header (not present, time_t, struct timeval, or struct timespec), and specify the sizes of the implementation-specific fields (see Message Header).

In an embodiment of the invention, the system is configured to minimize the data in the bootstrapping section. Data that could be considered as part of the initialization of the session is sent as normal messages in the preamble of the session. This data includes information about the host where the sensor is running:

Platform information: machine architecture, OS, OS release

Data representations (e.g., byte sizes of the members of the integer family)

Build information about the sensor. This is used by the analysis engine to verify that the encodings it is using are compatible with the ones used by the sensor.

Protocol and Data Set Negotiations

In an embodiment of the invention, the analysis engine supports multiple implementations of the meta-protocol, and individual sensors support one or more. When it invokes a sensor, the analysis engine specifies the set of protocols that it supports and the sensor then selects the first of those that it supports. If there is no intersection of the two sets, the sensor exits. If the analysis engine provides a null specification, the sensor uses its default protocol.

When the analysis engine invokes a sensor, the analysis engine may specify a set of semantic codes representing the data that it is interested in. Again, a null set may specify that the sensor should use its defaults. Some of the semantic types specified by the analysis engine may not be supported by the sensor, either because that data is not available on that platform or because that version of the sensor did not support extracting that data. These unsupported semantic types are omitted from the messages sent by the sensor, rather than being marked as "unsupported." In one embodiment of the invention, the sensor is allowed to insert into the messages data from semantic types not requested by the analysis engine, because the cost of customizing messages to the exact request may exceed the cost of building and sending a message containing some unneeded data items.

As it processes each message, the analysis engine may discard any data items that it is not interested in. This allows an older version of the analysis engine to work with a sensor that has been enhanced to send data that the older analysis engine may not be able to use.

Login Correlations

For UNIX and its variants, the init (process control initialization: the parent of all other processes) creates a getty process for all lines on which logins are to be enabled. This includes both physical connections (console, terminal lines, modems, etc.) and network connections. getty initializes the line and monitors for a connection attempt, at which point it invokes a login process. If the user successfully logs in, the login process exec's the specified shell for the user (exec replaces the program running as the current process with a new program, as opposed to running the new program as a child process of the current process). A failed login attempt or the end of a successful login session generates a signal to the getty that triggers it to re-initialize the line and await the next login attempt. A failed login attempt occurs when the user has failed to enter a valid username-password pair within the allotted interval or has exceeded the allotted number of attempts to enter a valid pair.

The recording of the login process has minor variations over the variants of UNIX. The stereotypical pattern is that when a valid username-password pair is entered, the login process writes a record to the utmp and wtmp files and updates the lastlog file. The utmp file tracks who is currently logged in, and the wtmp file provides a historical record, including both completed login sessions and active sessions. The lastlog file contains the time of the last login for each user, and the previous value is written to the user's terminal as part of the "hello" message. When the user logs out, the getty process removes the corresponding entry from the utmp file and writes a session-end record to the wtmp file. The getty process must perform this task because the login program is no longer present (it replaced itself with the user's shell program), and the user's shell cannot be trusted to make these updates: the shell may terminate abnormally (i.e., not have a chance to do the update), or the author of the shell program may forget to do this (users can create custom shells).

The details of recording of failed logins varies over platforms. Most platforms write reports of failed logins to the authentication facility of syslog, and some write to a designated file (e.g., loginlog in Solaris). For most, the threshold for reporting is, by definition, the maximum number of attempts allowed before the connection is severed. Consequently, most modern password-guessing attacks involve a single guess per connection, thereby not generating any explicit reports of a failed login attempt.

syslog is a unified logging mechanism that can be written to by any program running on the system, and it is widely used by server programs and other programs that typically run in the background. syslog messages are assigned afacility and a logging level. The system administrator uses these values to specify, via the syslog.conf file, how these messages coming from various programs should be handled: they can be discarded or directed to various log files, the host's console, specified users, other hosts, etc.

When the user's shell starts, it reads one or more initialization files, commonly known as RC files (for Run Command). Different shells can have different names for their initialization files, but there are also shells that use initialization files from their predecessors. For example, the tcsh (Tenex C-Shell) is a successor/extension to csh (C-Shell) and uses the initialization file for csh if it does not find the tcsh-specific initialization files. A shell program typically consults either:

the host-wide initialization files and then the user's initialization files (if present); or the user's initialization files, or, if they are not found, the default (host-wide) initialization files for that shell.

Sometimes a user switches from one account into another account to execute a few commands before returning to the original account. The most common use of this is for a system administrator to switch from his normal (unprivileged) user account to the root (superuser) account to perform a few privileged operations (e.g., system administration, software installation) and then return to unprivileged status. Other common usages involve users temporarily switching from their personal accounts to a functional account (e.g., application or project administrator) or to a group account. Having to logout and log back in would be too inconvenient (and slow) and would encourage users to subvert the reasons for having separate accounts. To avoid this situation, the su command (Substitute User) allows a user to easily switch between accounts. Logging of su's has some minor variation over platforms. For example, in Solaris, reports go to the log file sulog, while in Linux, the reports use the syslog system and are sent to its authentication facility.

Network services that provide terminal-like interactions (e.g., telnet, rlogin, and ftp) use pseudo-terminals to emulate the drivers for hard-wired terminals. When a connection is made to one of these services, a pseudo-terminal is allocated and the server writes a record to wtmp, but this is simply a convention, not an enforced requirement. Services that use the login program (e.g., telnet, rlogin) have records written to utmp and wtmp the same as hard-wired lines. However, some servers such as FTP allow access similar to login, but by a separate mechanism. Some of these record these "logins" in utmp and wtmp and some do not. For example, the Solaris FTP daemon does not, but the WUSTL (Washington University in St. Louis) FTP daemon does.

In addition to user logins, the utmp and wtmp include entries for the changes in the run-level of the host, the most important of which is boot. If the computer goes down without the users being properly logged out, no logout records for those users will be written to wtmp. System utilities that display login session times are aware of this situation and use a boot record as an implicit logout record for any sessions open at the time. These program also have another implicit close for login sessions: if there is a login record on the same line being used for an open session, the program implicitly closes that open session as of the time of the new login. Since there cannot be two active logins on the same line, the assumption is made that the logout record was somehow lost, and the new login is the best guess for the end of the previous one on that line.

Some platforms have two versions of utmp and wtmp: an earlier format retained for backward-compatibility with various programs and an "extended" version. Other platforms just use the extended version, having upgraded all the programs that had used the earlier format. The earlier format dates to when networks were small and when the host was used either as a workstation or small time-sharing system. As the Internet grew and hostnames became longer (for uniqueness), the size of the field allocated for hostnames was inadequate, resulting in hostnames being truncated (often losing most or all of their domain name). Similarly, as the hosts could support more connections—both number and categories—the fields for recording this information proved inadequate. The extended format allocated more spaces to such fields, and added additional fields.

Camouflaging logins. An attacker will typically try to wipe out the records of his login session. He wants to
  hide his presence while connected
  hide the information about that connection after he logouts
  hide existence of unexpected login
  hide where he connected from
  hide the exact time window when he was connected Initially, attackers would simply delete the log files, but this was overkill that often revealed that something was happening or had happened. The next approach was to save copies of various log files when the attacker first logged in on a compromised account, and then after breaking into a privileged account, he would replace the current version of the log file with the older version. While this would eliminate things recorded during the break-in, it also eliminated records of legitimate activity. If noticed, the absence of expected records can be used to identify the occurrence of an attack and an approximate time window.

The current approach has advanced to a more finely tuned set of deletions. The initial program to do this was named zap and included in the original rootkit package. Its successor was named z2. Both zap, z2 and their refinements can be found in various versions of rootkit and its derivatives. These programs null-out—overwrite the data fields with zeroes (the "null" value)—the records in utmp, wtmp and lastlog. This leaves "holes" in the log files that are silently ignored by the standard system utilities.

When removing the entry for a compromised login from wtmp, there are two basic approaches seen in the variants of zap:
  delete all records for the compromised account
  delete only the record for the current login Files with holes. In UNIX and its variants, files are composed of a sequence of 512-byte disk blocks, but these blocks do not need to be continuous on the disk, or even in the same relative order. The i-node for the file contains an ordered list of the addresses of the blocks that contain the contents of the file. If all the bytes in one of these blocks have the value zero, the block does not need to be allocated, and its address is instead given as zero. This significantly reduces the space used by certain types of files, typically binary executable files where there are large global data structures that are initialized to zero. But it also occurs in other binary files, such as lastlog.

For example, if the contents of the file are written by using lseek(2) to reposition the offset at which to write the components, "holes" can be left in the file. However, writing the file byte-by-byte from beginning to end will not produce holes. Thus, a sparse data structure written into a binary file might have a file length of 102,400 bytes (200 512-byte blocks), but actually use only 15 blocks (for instance). However, if one were to do a standard copy of this file, the copy would require 200 blocks for its contents.

Roll-down. To handle the problem of the potentially unlimited growth of many log files, most hosts have an automated background process that periodically rolls down those log files. The simplest scheme is for the roll-down process to rename a log file to a name designating it as the older version, for example, from <LogName> to <LogName>. old. The next time this roll-down occurs, this renaming of the current log file to the rolled-down name has the side effect of deleting the previously rolled-down file. Often one wants to keep more than just the immediately previous contents of the log file, so the roll-down proceeds through a series of suffixes. Traditionally, the suffixes used are integers, starting at zero.

Different log files can have different roll-down parameters. For example, syslog files are traditionally rolled down every day, keeping 7 to 8 old copies. The wtmp file grows more slowly and is used as a database by system commands (last), and hence it tends to be rolled down weekly, with only a single previous copy being retained. Typically, an 8-day retention period is convenient because it ensures that the old log files will still be present when the weekly backup is run, which at many sites is the first level of backup that is not quickly overwritten. An extra day (sometimes two) is added as a pad to the sequence just in case there is a problem doing the backup at its usual time.

Some log files do not get rolled down because they do not have unconstrained growth. lastlog is not rolled down because its size is based upon the number of users on the system, not the number of logins of those users. Similarly for utmp: its size is determined by the number of tty lines (hard-wired and virtual) used for logins, and thus its size tracks roughly the maximum number of concurrent logins since the host was last rebooted.

The cron and at daemons are proxies that allow users to run commands at specified times, even if they are not logged in. The difference between the two is that cron runs the command each time the time specification is satisfied (e.g., 22:35 on the first Monday of each month), whereas at runs the command at the single time specified. Attackers use at job to disguise cause-and-effect by separating in time the execution of a job from the login session that set up the job. Attackers use cron to run periodic administration and maintenance tasks as part of an ongoing attack, such as off-loading data collected by a Trojan Horse. The cron and at daemons send records of their invocations to a log file, the format and contents of this file varies more between platforms that the basic log files. Typically, the start time, the invoking user, and the command name are recorded. Some platforms also record the time when the job finishes.

The inventive system uses primary, secondary, and indirect sources of information in performing login correlations. For example, in determining a login session for a user account, the wtmp file is the primary source, containing entries for both login and logout. A secondary source is provided by the access times on the files related to the user shells: the shell RC (Run Command) files indicate the last usage of the shell by that user account, and this typically corresponds to the last login. The access time on the logout RC file and the last-modification time on the shell's history file provide secondary evidence for the last logout on that account. Example indirect sources are entries in other log files, such as an entry recording a su (substitute user) operation from that user account to another account (such as root). Other indirect sources are the access time on RC files for applications (other than shells), the timestamps on directories and files that can be updated only by that user (and the superuser root), e.g., a change in the last-modification date on a file owned by the user and with access rights (permissions) specifying that only the owner can modify that file.

In an embodiment of the invention, the system collects data related to logins with multiple sensors, such as:
 a) the Directory-Tree Scanner that collects information from the directories and from the i-nodes
 b) the sensor for the password file (and shadow password file if it exists)
 c) sensors for each of the logfile formats:
  i) cron and at logs
  ii) lastlog
  iii) sulog
  iv) syslog
  v) utmp/wtmp Configuration discovery: Except for syslog, these log files have standard locations, with some variance between platforms. For example, lastlog is in directory /var/adm on Solaris and in directory /var/log on Linux. The pathnames for the syslog files are extracted by a data collection sensor from the syslogconf file.

The analysis engine may use the pathnames for the active log files (the ones receiving new records) as a starting point for deducing which files are rolled down copies of these log files. Deducing the roll-down pattern(s) from the database of filenames (from the Directory-Tree Scanner sensor) is the preferred approach. There are but a few conventions for naming schemes, but many schemes for performing the roll-down (a dedicated shell script called from crontab, shell commands that are part of a larger script called from crontab, or such scripts called indirectly from crontab), and the former is much simpler computationally than the latter.

lastlog: The sensor that processes lastlog makes two passes over the file. The file is an array of struct lastlog data structures, indexed by the User ID. In the first pass, it reports the data from all the non-null entries. The second pass examines the raw file, looking for disk blocks that are allocated, but null. This condition arises only if the file has been copied or updated by a program other than login.

The addresses of the first and last bytes in this block of nulls are divided by the size of the struct lastlog, yielding the indices of the array elements that would have had some of their data in this disk block. Since these indices are User IDs, the system now has a range of User IDs whose records may have been tampered with.

The extent to which the inventive system can identify the specific user whose records were tampered with depends upon the size of the struct lastlog records and on the pattern of allocation of User IDs on the host. However, the system does not need to identify a single user account as having its records tampered with. Identifying multiple accounts expands the search space somewhat, but does not affect the capabilities of the system.

Different platforms have vastly different sizes of struct lastlog. On 32-bit Solaris, it is 292 bytes, or more than half of the disk block. Thus, a block containing all nulls will implicate at most three consecutive user accounts. However, on Linux 2.2, the size is only 28 bytes, and thus there is a range of 20 User IDs implicated.

On many hosts, the User IDs are sparsely allocated. For example, in a medium-sized company that assigns Employee IDs sequentially and uses those numbers as the User IDs (for consistency and to avoid conflicts), the gaps between the IDs for people in a department cluster can be expected to be typically in the tens and hundreds (based on experience). The gaps between the active accounts on individual hosts can be even wider. For example, a departmental file server may provide active (local) accounts only for the system administrators (and not the other users).

wtmp: The sensor sends the raw records to the analysis engine plus records for each login session (beginning and end), with the method of closing the session identified: by logout record (explicit), by reboot (deduced), by tty line reused (deduced). Pairing the login and logout records in the sensor rather than the analysis engine is simpler because it naturally flows from the same data structures used to identify inconsistencies. The raw records are used by the analysis engine to deduce additional information from any inconsistencies in wtmp reported by the sensor.

Password-guessing attacks can be detected by the volume of records written by the telnet and rlogin servers that do not have a subsequent login record. Password guessing attacks using the FTP service can be similarly detected if the FTP server writes login records (some do, some don't).

syslog is used by a wide range of applications. The corresponding sensor reports each entry and the analysis engine locates the relevant records and performs correlation against the records related to login sessions from other sensors.

utmp vs. wtmp: The order of the entries in utmp reflects the order of entries in the wtmp since the last reboot. A comparison of the two can sometimes reveal information that has been deleted from both. For example, if the attacker nulls out the utmp record for his login, the analysis engine can determine which tty-line that was (via reconstruction from wtmp). Then, using records in wtmp for that line and knowledge of the schemes used by zap, the analysis engine can eliminate some user accounts from consideration as having been the account used by the attacker. Similarly, the analysis engine can narrow the time window for the attack by elimination.

The fully accurate reconstruction of utmp from wtmp requires that the set of wtmp files (current log and rolled down copies) cover the period back to the most recent system boot.

utmp and wtmp: old vs. extended: If the platform has both the old and extended formats for utmp and wtmp entries, the sensor sends the information from the extended format (it is a superset of the information in the earlier format). It checks the record in the earlier format against the extended format, and reports any inconsistencies. Occasionally an attacker will modify only one of the two copies, leaving significant useful information. For example, if the attacker's experience is with a platform that has switched to the extended format (e.g., Linux), he may be unaware of the redundant logging, and consequently his tools are designed to only modify one of the format. Or, he may have designed the tools for handling the redundant logging, but the tool malfunctions because it was not tested on the target platform.

sulog (or su records in syslog): The sensors report the relevant records in this log, and any malformed entries (suggesting tampering). The su record supplies information about the user that initiated the su and the account su'ed into. The analysis engine attempts to match su records against records for the initiating account, which may be either a login or another su. If it cannot find a corresponding record, this indicates that the wtmp log had been tampered with (the record for the initiating account was deleted). However, there can be legitimate reasons for a mismatch, and the analysis engine checks for these, including them in both its assessment of the suspiciousness of the inconsistency and the attached notes that it generates. Some legitimate reasons are as follows:

a) Dissimilar intervals covered by the log files: entries for su's pre-date the period covered by wtmp
    i) Incompatible roll-down parameters
    ii) On some platforms, sulog is omitted from the default roll-down script.
  b) When starting a remote xterm (terminal window in the X Window System), the user can specify that no record be written to utmp, with the side effect that no record will be written to wtmp.
  c) For a user running a window system on the host's console, the local terminal windows do not have entries in wtmp, but the su log entries refer to the tty line associated with the individual window where the command was issued, thereby not providing a direct series of connections. However, the user name in the su log entry is typically good enough evidence for linking the su to the underlying login.

For insider abuse, su information can be critical in identifying who was responsible for a privileged operation. On the other hand, su is rarely used as part of a remote attack. In this case, su information is used for elimination and escalation of potentially suspicious events. When the analysis engine identifies any potential suspicious action that required privilege, it examines whether there is a record of someone having that privilege at that time (either via su or a login directly to that account), and then checks whether it could have been run by an expected background process such as the cron daemon. Any unaccounted for changes are marked as having been performed by unexpected means, and thus suspicious.

Unfortunately, the su log entries only specify when a user first acquired privileges of the target user. The logout record for the underlying session provides an upper bound on the su session, but this can result in an assumed session duration that is unrealistically long because some users stay logged in for very long periods (weeks or more). Hence, an embodiment of the invention may use a time decay function to provide a probability for the end of the su session, and this is used in the computation of the level of suspiciousness of events potentially attributable to that su session. The parameterization of this function can be modified by the system operator based upon his knowledge of the people associated with those accounts.

Roll-down: Before invoking the sensors for the log file, the analysis engine examines the records from the Directory-Tree Scanner and identifies which log files are being rolled down, and the scheme being used. It then invokes the sensor specifying the sequence of files from oldest to the newest, and the sensor treats this sequence as a single log, thus maximizing the coverage.

Truncated dates: The syslog files use a textual representation of the date and time that omits the year. The analysis engine uses a combination of the last-modification date on the file and the roll-down parameters to supply the deduced date for the creation of the file, from which the sensor determines the year for the first entry. This two step process is critical because the first entry in the file does not correspond to the creation of a file. For example, if a log file was created at 1999-12-31 23:59:59 after rolling down the previous version, the first item logged to that file may not occur until for seconds, minutes, hours, days, or even longer, depending on the what type of events the log file is covering and whether the computer has any activity during the holiday. The sensor detects the change between December (month 11) and January (month 0) in the dates, and increments the year from 1999 to 2000, thereby providing the correct year for the entries. Some log files use the syslog format and are handled similarly.

User Home Directories: The analysis engine then checks the timestamps on files in each user's home directory for consistency with the recorded login sessions. The password table enumerates the users, their home directories, and their login shells. The last-access times on the RC (initialization) files for the login shell are compared to the user's last recorded login. Some RC files are accessed only when creating a login shell, and these are expected to match the login time (with a small delay acceptable). Other RC files are accessed for each invocation of a shell, for example, each terminal-emulator window runs its own shell. These invocations can be scattered throughout a login session. It is also possible to have shell invocations outside any login session: programs invoked by cron, at, or from a program running (in the background) when the user logged off. Invocations by cron or at can be correlated to entries in those log files. Background processes spawned by normal users that run beyond the login session are rare (based on experience), and those that themselves spawn new shells (except at invocation) are very rare. The expected false positive rate is low enough that it can be handled manually.

A shell can have multiple options for the RC files that it uses, and this selection is documented as a decision tree. The inventive system encodes these choices as a declarative data structure which is used by a generic set of rules for shells (rather than customizing a common base of rules for each shell).

History files: Various shells provide a session history mechanism, allowing the user to edit and repeat previous commands. These shells also allow the history to be saved over sessions. Various hacker tutorials advise deleting the history files in compromised accounts to avoid leaving a record of the actions the hacker performed. Deleting these files has been incorporated into various hacker scripts. The inventive system uses the absence of history files where they are expected as evidence of a potential compromise. A good estimate of the time of the compromise is provided by the last-modification date on the user's home directory (that timestamp is updated by the removal of the history file), if it falls outside any recorded logins on that account. Determining when a history file should be present is a two-step process: first verifying that the login shell supports history files and then scanning the shell's RC files for the commands that control whether to keep a history file.

False positives are occasionally produced when one user examines another's RC files for example code to be used in his RC file (or simply copies the files). If only a proper subset of the relevant RC files are examined, the analysis engine of the invention recognizes this as not matching the sequence for a shell and does not label this window as suspicious. The temporal order of RC file accesses for shell invocations is often different from other uses. However, this data is easily manipulated, and hence the analysis engine gives it no weight, but does note it in the annotation attached to the event.

Window system initialization files: The typical user on the system console will be using a window system, and this access initialization files in the user's home directory for customization information. These files provide yet another source of information about user login times. As with shells, different window systems use different names for their configurations files, and various components have multiple choices (e.g., window managers) each of which can have its own initialization files. In addition, if the login is handled via the window system instead of the window system being invoked from the login session, different initialization files may be used, and even a different sequence of shell invocations.

Finding Names of Deleted Files

At the core of the UNIX File System is the i-node, which contains the file's properties (e.g., owner, permissions) and pointers to the sequence of disk block containing the file's contents. An i-node does not contain the name of the file, thereby allowing files to have multiple names (hard links).

A directory is a special type of file that maps a file name to the corresponding i-node. A directory is a series of dirent (Directory Entry) structures. Because different implementations of the UNIX File System use slightly different version of the dirent structure, dirent's are typically accessed through an API (readdir(3)) that provides an abstraction that hides these variations. In one embodiment of the invention, the analysis engine does not use this API, because the sensor extracts information from the raw structure that is not available via the API.

An abstract dirent can be viewed as a 4-tuple:
1. an i-node number
2. the offset of the next dirent
3. the length of the filename
4. the character string for the filename (null-terminated)

Some implementations have the offset of the next dirent computed relative to the beginning of the directory file, while other implementations compute it relative to the beginning of that dirent. In this description, we will use the latter and we will treat all the integers as 4-byte values (this is for simplicity—in the actual structure, the length of the filename is given as a 2-byte value). For simplicity of explanation, we will attach as a prefix the offset within the directory of each dirent.

Because the i-node value needs to be aligned to the corresponding boundary in memory, there can be used bytes between the end of the filename and the beginning of the next dirent.

In the UNIX filesystem, files are not directly deleted. Instead, they are unlinked from directories; i.e., the mapping from the filename to the i-node is deleted. When the number of links drops to zero, the i-node is deleted. Since virtually all files have a only single name, "unlinking a filename" is commonly referred to as "deleting a file." When a filename is unlinked, the bytes used by its dirent are added to the unused bytes after the filename in the immediate preceding dirent, and the i-node value is set to zero.

The Method—Explanation by Iterative Examples

The initial directory, given as a dirent prefixed by its byte-offset in the directory, is 0-(<InodeM>, 16, 1, ".")

16-(<InodeN>, 16, 2, "..")

32-(<InodeP>, 20, 6, "foobar")

52-(<InodeQ>, 24, 9, "tempfile1")

76-(<InodeR>, 24, 9, "tempfile2")

100-(<InodeS>, 24, 9, "last-file")

If tempfile1 is unlinked and then tempfile2 is unlinked, the resulting directory, showing the deleted dirents, is 0-(<InodeM>, 16, 1, ".")

16-(<InodeN>, 16, 2, "..")

32-(<InodeP>, 68, 6, "foobar")
   52-(0, 24, 9, "tempfile1")
   76-(0, 24, 9, "tempfile2")

100-(<InodeS>, 24, 9, "last-file")

and if they were unlinked in the reverse order:

0-(<InodeM>, 16, 1, ".")

16-(<InodeN>, 16, 2, "..")

32-(<InodeP>, 68, 6, "foobar")
   52-(0, 48, 9, "tempfile1")
   76-(0, 24, 9, "tempfile2")

100-(<InodeS>, 24, 9, "last-file")

The structure of a directory becomes more complicated when new links are added after some files have been unlinked because the free space containing unused dirents is reused for new links. For example, if a file named "new-tempfile3" were added, the directory would become:

0-(<InodeM>, 16, 1, ".")

16-(<InodeN>, 16, 2, "..")

32-(<InodeP>, 20, 6, "foobar")

52-((<InodeT>, 48, 13, "new-tempfile3")
   80-(overwritten, 24, 9, "tempfile2")

100-(<InodeS>, 24, 9, "last-file")

In this particular example, the result is the same for both orders of unlinking. Notice that the longer filename "new-tempfile3" of the new dirent required more space than was available in the dirent used by "tempfile1": the former has 9 characters plus a terminator, and thus fits into 3 words (12 bytes) with 2 unused bytes, whereas the latter has 13 characters and a terminator, requiring 4 words (16 bytes). This overwrites the first word of the deallocated dirent for "tempfile2".

If the new filename was instead shorter than "tempfile1", there could be a gap between the end of its dirent and the beginning of the deallocated dirent for "tempfile2":

0-(<InodeM>, 16, 1, ".")

16-(<InodeN>, 16, 2, "..")
   32-(<InodeP>, 20, 6, "foobar")
   52-((<InodeU>, 48, 7, "newfile")
   68-word containing the bytes: "1", 0, unpredictable, unpredictable
   72-(0, 24, 9, "tempfile2")

100-(<InodeS>, 24, 9, "last-file")

In one embodiment, the analysis engine starts at the beginning of the directory, stepping through the active dirents. In a UNIX filesystem, the "." and ".." must be present for the directory to be valid. This provides a simple initial condition for the iteration.

1) The analysis engine computes the size of the gap between the end of the filename and the beginning of the next active dirent. If this gap is not large enough to contain a minimal dirent—one with a one-character filename—it proceeds to the next active dirent (using the offset in the current dirent).
  a) To find deallocated dirents in the gap, the analysis engine steps through the gap on each memory boundary on which a dirent structure could start. When the remaining gap is too small to accommodate a minimal dirent, the analysis engine ends the search, returning to the next level.
    i) At each boundary, the analysis engine checks whether the subsequent data is consistent with a deallocated dirent:
      (1) The i-node field is zero
      (2) The field for the offset of the next dirent is consistent
        (a) Greater than or equal to the current offset plus the size of a minimal dirent; and
        (b) Less than or equal to the end of the enclosing dirent (active or deallocated):
      (3) The field for the length of the filename is consistent
        (a) at least 1
        (b) the offset of the end of the filename including the terminator is less than or equal to the offset for the end of the dirent.
      (4) The filename is consistent
        (a) Terminator at the position specified by the field specifying the length of the filename.
        (b) The filename does not contain any illegal characters. In the UNIX file system, the illegal characters are the string terminator (0) and the character slash ('/').
    ii) If a deallocated dirent is located, the analysis engine repeats the search within the gap between the end of its filename and the address given by the field for the offset to the next dirent ("next" relative to the time it was deallocated).

The sensor that processes directories reports the deallocated dirents to the analysis engine as a partial order derived from the order in the gap at the end of each active dirent. The analysis engine then expands this partial order using constraints based on lengths of filenames: because deallocated dirents are used whenever possible, any active dirent with filename X of length N found after a deallocated dirent with a filename Y of length greater than or equal to N must have been linked into the directory before Y was unlinked.

Why Names of Deleted Files are Useful

Heavily automated attacks are common, if not the current standard. Many of these attacks are performed by "script kiddies": unskilled people simply using scripts written by others, often scripts posted to various hacker Web sites. However, elite hackers also routinely automate their attacks, to facilitate attacking large numbers of targets, to reduce the chance of errors that could lead to detection, and to dramatically shrink the time they are connected to the target, thereby reducing the chance of being detected and tracked.

Filenames, both individual names and sets of names, known to be used in attacks are incorporated into a database in an embodiment of the invention. This database is populated from a range of sources, including:
   scripts posted to hacker websites
   scripts posted to computer security web sites to demonstrate vulnerabilities
   files recovered from attacked computers at the operator's site reports of files recovered at other sites, either direct reports or indirect reports (e.g., from a CERT)
   filenames based on known patterns and modus operandi, for example, the file ".." (dot—dot-space).

The inventive system specifies filenames with regular expressions, simplifying the representation of variations on names and making it harder for the attacker to escape detection by generating filenames for each attack instead of using fixed names.

When the analysis engine locates an unlinked filename potentially associated with an attack script, the analysis engine often can draw multiple inferences:
   From the access rights to the directory, the analysis engine can determine which user accounts could have performed that operation, and from that it often can narrow its focus. The suspect account may have been compromised, or its assigned user may be the perpetrator.
   A time window for the attack, based upon timestamps on other files in the partial order centered on that unlinked dirent.
   Other suspect files
      in the same directory as the identified suspect files
      other files related to the suspect account and the time window.

The inventive system is able to draw the most inferences in a directory that has had few additions and deletions. This description fits most system directories: patches and upgrades are installed, but typically at a relatively low rate. Often the original file is not removed, but simply deactivated, yielding a simple directory structure.

In directories with high turnover of files, the combinations of possible sequences of linking and unlinking will minimize the partial ordering and the inferences that can be drawn from that. However, the mere presence of suspicious filenames is still a valuable warning and indicator.

Deleted Files

The Berkeley Fast File system is the basis of the native filesystems on most variants of UNIX. To improve locality of files and avoid the need to periodically de-fragment the disk, it subdivides disk partitions into cylinder groups (typically 16 cylinders per group). Each cylinder group has its own set of i-nodes and data blocks. Its placement algorithm for a new file is to use an i-node in the same cylinder group as the directory entry it is linked to. The initial data blocks for the file also go in the same cylinder group, but very large files have their data blocks spread over multiple cylinder groups to avoid them taking a disproportionate share from any one cylinder group. Further details of this placement will be apparent to one skilled in the art.

Unused i-nodes and data blocks are kept on separate free lists. When a file is deleted, its i-node and data blocks are put on their respective free lists with their contents largely intact.

The file system occasionally gets corrupted, either from a hardware fault or because the system failed to complete a sequence of write operations. UNIX has historically provided utilities that provided varying levels of help in repairing various levels of damage to the disk. These tools can work reasonably well for smaller files, but have significant limitations for larger files. There are third party tools that reverse the disk block allocation algorithm to improve the accuracy of disk blocks used to re-constitute a file.

In accordance with the invention, when the analysis engine suspects the presence of a deleted file, it uses the existing third-party tools to attempt to re-assemble the contents of that file (the i-node and the data blocks), and then tries to match those contents to a directory and a filename, using weighted constraint satisfaction and producing a set of ranked alternatives. The analysis engine first uses the constraint that the i-node should be in the same cylinder group as the directory entry. It applies a variant of the standard system utility file to the contents of the file and compares the result to the conventional usage of the filename's suffix (if any). Next it uses the temporal information from both the raw directory files and from the free lists. These are weak constraints, but in a directory tree that has a very low rate of change, these can be effective. These constraints are as follows:

In the raw directory, the timestamps on the preceding and succeeding directory entries provide a initial guess at bounds for the timestamps in the deleted filename. If the dirent for the deleted filename has unnecessary padding (more than needed to round up to the next possible boundary), the weighting is downgraded.

Ordering relationships between unlinked filenames in the directory are used to find other anchors (e.g., based on suffix match).

Timestamps in the i-node recovered from the free list.

Ordering relationships on the free lists versus the partial ordering of unlinked filenames in the directories in the cylinder group.

File Signatures

Many attacks include replacing some of the system files with modified versions. The most common modification is to create a Trojan Horse. A Trojan Horse is a program that has been modified to perform additional activities, using the privileges of the legitimate user of the command. A less common modification is to totally replace an unused command (e.g., part of a deprecated or unused application) with an executable that functions as an agent for the attacker when he is not connected to the system. This camouflages the introduction of a new command onto the system.

Simply checking the timestamps associated with a file is not an effective method for finding which files an attacker might have changed, because there are a large set of publicly available hacker tools that automate setting the timestamps on the modified file to be the same as those on the original.

Checking the signatures of a computer's system files is one of the quickest, most effective methods for determining which files may have been replaced by an attacker. The intrusion detection system may use a database of signatures of a collection of files to check for changes. The signature may use a CRC (Cyclic Redundancy Check) checksum, but these signatures are easily forged. Other methods may include cryptographic signatures, with RSA's MD5 (Message Digest 5) algorithm being the most commonly used. Two major applications of these signature databases include computer security and software package management.

The problem of high false positives may be reduced by allowing the operator to specify a policy describing what changes can be ignored. Further, by supporting multiple cryptographic algorithms for computing signatures, the system operator can trade off increased strength against increased cost to compute. Tripwire is the best-known example of such systems.

Software package management systems use file signatures to check the consistency of the installed package. Two common problems with such systems, however, are:

Name collisions: another software package uses the same name for one of its files as the managed package and its installation overwrites that file from the already installed managed package.

Incomplete upgrades and downgrades: mix of incompatible components from different releases.

For use in computer security, the database of signatures needs to be updated frequently and kept off-line in between uses. If it is not updated frequently, the operator can easily miss the few suspicious changes among the large number of legitimate changes that are a routine part of managing a computer system (e.g., patches and upgrades to existing applications, installation of new applications, changes to the set of users and hosts in the cluster). If the database is left online, it can be modified by the attacker so that his changes do not raise an alert. Tutorials on the Web for novice hackers alert them to the possibility of a Tripwire database, and then explains how to run Tripwire to update the database to include the files changed by the hacker, assuming that the database has been left on-line. At many computer facilities, these requirements of frequent updates and off-line storage are incompatible, minimizing the effectiveness of this approach.

This approach has the serious problem that if a change is erroneously accepted as legitimate, it is incorporated into the database as a valid signature and no warnings are issued during subsequent runs. Some tools allow the operator to examine the transaction history, but do not provide the context needed to effectively reevaluate the decisions. This approach also suffers from the tool having to be acquired and installed before the attack—there needs to be an existing validated database to compare against.

Using the package management database to check file signatures has three problems. First, it is an online database (by design) and hence subject to tampering by the attacker. Second, not all relevant software is installed under the supervision of the package management system. Third, some of the files installed as part of a package are expected to change, and hence produce false positives. Examples of files expected to change are configuration files and log files (included in the package as an empty file so that the file receives the correct set of properties).

Multiple Checks

In an embodiment of the invention, the analysis engine approaches the problem by cross-checking the available sources of signatures, and issuing a multi-level assessment of whether that file is suspected of having been maliciously changed.

One check is to iterate through the files in the package management database, comparing the signatures in the database to the signature of the current version of the file. If the signatures match, the analysis engine draws no conclusion, because this provides no evidence to distinguish the two cases: (1) the file could be correct; or (2) the attacker has modified the database to have the signature of a file he installed. If there is a mismatch of signatures, the analysis engine then checks if the mismatch is expected, and if not, the file is flagged as suspicious. Expected mismatches are determined by a set of rules:

- Package management systems allow the package creator to place files in various categories. If the file is in one of the categories regarded as changeable (e.g., configuration files, log files), ignore the mismatch. However, since the categorization is dependent on the efforts of the package creator and mis-categorizations are common, a file not being in one of these categories is not strong evidence of a problem.
- If the file size in the package management database is zero, assume that it is a logging file.
- Attempt to match the suffix on the file against commonly used suffixes for files expected to change. For example, ".conf", ".config", ".log".
- Compare the location of the file against conventions for where changeable files are place. For example, the directories /etc and /var/lib are common locations for configuration files and configurable scripts, and /var/log is a traditional location for log files.
- Compare against an internal database of known exceptions.

Another check is to compare signatures for files listed in the internal database of signatures. This database is a combination from multiple sources:

- Some software vendors publish signatures for their products.
- Signatures computed from installed copies of the software
  - by the manufacturer of the inventive system for inclusion in the intrusion detection system distribution
  - by the customer for applications installed at his site Just as the package management database cannot be expected to be complete, neither can the inventive system's internal database, because there are too many vendors, too many products, too many releases (including beta versions and evaluation versions), and too many patches and upgrades (including private and limited-distribution). The internal database has a structure related to that of the package management databases: it contains not just filenames and signatures, but also information about the origin of the file, such as the application, its release identifier, the vendor, etc. This additional information is used to validate the signatures in the online package management database (where there is overlap). Any mismatches are marked as suspicious.

The internal database is also used to suppress false positives from the check using the package management database. Vendors that distribute their application in a package often distribute minor patches as simply files for the user to install, and hence they fail to update the package management database.

Files in system directories that are not in the package management database or the internal database are flagged as mildly suspicious. The operator can suppress these warnings, either in total or for selected directory trees.

Thus, the inventive system can be configured to utilize signatures in the package management database. By recognizing that most of the files of interest are not specific to an individual host, the need for precomputing signatures is largely eliminated. For these, the system produces signatures from the software distribution. Furthermore, in an embodiment, the inventive system uses information from the file type, the filename, and the package's filetype categorization to determine whether it is suspicious that a file has changed from its original contents. This largely eliminates the need to specify a policy.

The system of the invention may be used in conjunction with automated configuration checkers to detect changes made by the attacker to configuration files, or, since these files are typically in human-readable form, they can be manually audited for suspicious entries.

SetUID Buffer Overflows

Currently, the most common exploits involve a buffer overflow attacks on SetUID commands. A SetUID (also "SUID") command is one that runs with the privileges of the owner of the command instead of with the privileges of the user invoking the commands, and this attribute is specified by a flag in the permissions for the command (an executable file). The ownership of files and processes in UNIX (and variants) is specified by an integer called the UID (User Identifier). Thus, the name SetUID comes from the operating system setting the UID of the command's process to be that of the owner of the file.

SetUID commands are relatively rare, but have an important function: they provide restricted access to system resources. Some of these commands limit the operations that a user can perform. For example, the lpq (Line Printer Queue) command allows normal users to view a summary of the jobs in a line printer's queue (e.g., order, priority, size, submitter), but not to modify the queue, nor to examine the contents of individual documents in the queue. Some SetUID commands limit the objects that the user can operate on, such as the lprm (Line Printer Remove jobs) command, which allows a user to de-queue jobs he submitted but does not allow him to remove jobs submitted by others.

Buffer overflow attacks involve exploiting a programming error in which the size of an input data item is not checked before being copied into a fixed-length buffer. The buffer is typically large enough to hold any legitimate value, but the programmer did not anticipate someone using the command with malicious intent. Buffer overflows overwrite other data being used by the program, changing its execution path. Some of these overwrite parameters and other control values. However, most buffer overflow exploits involving overwriting the control information on the process's stack, causing the process to execute machine instructions contained in the input data. This exploit has little value for commands running with the privilege of the user invoking it, because the user already has privileges to perform those operations directly. However, when a SetUID command is thus exploited, the user is able to have the code executed with the privileges of the owner of the command.

In UNIX and its variants, most SetUID commands run with root (superuser) privilege, and the typical buffer overflow exploit for these commands is to have them give the user a shell running with root privilege, thereby allowing them unlimited access to the host. These attacks are sensitive to the exact formation of the data used to overflow the buffer.

Almost all buffer overflows attack take effect at the very beginning of the execution of the program, because the data causing the overflow is supplied as part of the command invocation or setup. Hence, the command is subverted (replaced) before it has a chance to perform any of its intended actions. This observation is key to the approach used in an embodiment of the invention to detect buffer overflow attacks ex post facto.

The inventive system includes a database of SetUID commands and the files they access (in UNIX, the file system is the interface to system resources), and how (read, modify, etc.). The analysis engine examines the last-access time of each SetUID command—this is a reasonable approximation of when the command was last run, because there are a few other operations that update the last-access time, but these are uncommon/infrequent (e.g., making a copy of the executable, searching the executable for strings and symbols). This access time is compared to the timestamps on files that the command is expected to access. If those timestamps are earlier than the last-access time on the SetUID command, this is evidence that a SetUID buffer overflow attack may have occurred. For example, the eject andfdformat commands in Solaris 2.5 are vulnerable to this attack. The eject command cause removable disks (floppies, CDs, etc.) to be ejected from the drive. A legitimate user may issue an eject command to check if any media is in the drive, leading to a false positive. A false positive can also arise if the user executes the eject command in a window connected to a host other than the one intended. The fdformat command formats floppy disks. While it wouldn't be usual for someone to execute fdformat in the wrong window (as with eject), it would be very unusual for him to execute it if there wasn't a floppy disk in the drive.

The inventive system attaches an explanation (annotation) to each event, and this explanation includes a note not just about the possibility of false positives, but examples of how they arise. Attached to each component of an explanation is a link to additional evidence. For example, for the wrong-window possibility for eject and fdformat, if the inventive system has its sensors enabled for other hosts within the cluster, it shows who was connected to the subject host and a remote host at the time the command was executed, and then shows when the corresponding command was last accessed on the remote hosts. If a legitimate execution of the command in question occurs on one of those remote hosts very shortly after the time in question, the inventive system highlights this as the reason for substantially downgrading the suspiciousness of the underlying event. If a legitimate execution of the command in question occurs substantially after the time in question, this is possibly a subsequent operation that has masked the one at the time in question, and thus is linked in as slightly downgrading the suspiciousness of the underlying event. The extent of the downgrading of the suspicion level of the underlying event is determined by a time decay function. In an embodiment of the invention, this time decay function is an exponential function.

Searching for suspicious invocations of SetUID commands is performed by the analysis engine. The dependencies for each known SetUID command is encoded in a language with the power of first-order mathematical logic. Predicates in this language utilize both set operations on data from configuration discovery and from the individual sensors (e.g., results of a pattern-match on filenames). This approach thus provides for classes of objects in encoding dependencies. SetUID commands having no dependencies specified in the database will have any invocations flagged, because these could be programs created by the attacker. Further filtering occurs for the level of privilege of the user.

Paralleling the SetUID commands are SetGID (Set Group ID) commands, which are handled in a similar manner.

Configuration Checks

Configuration scanners scan a computer for vulnerabilities so that they can be fixed before they were exploited. Typically, most of the vulnerabilities detected are part of the standard installation of software from the vendors (most of whom persistently refuse to fix the vulnerabilities). Some of the vulnerabilities are the result of choices made by the system administrators and normal users, often in understandable ignorance of the security implications. Examples of vulnerabilities checked:

- weak access controls on directories and system files: both ownership and permissions granted
- weak access control for network connections to host services enabled
- weak passwords (detected by trying to crack them)
- system commands with known vulnerabilities (checked by some products)

When an attacker breaks into a host, he often creates a backdoor to provide a simple, often less detectable, method for re-entering the host. Some of the most common ways of creating such a backdoor involve modifications to the system configuration. Thus, configuration checkers are useful not only for helping to prevent break-ins, but for finding changes made by the attacker. Many configuration checkers have been extended to include checks for the vulnerabilities known to be introduced by attackers (in addition to ones introduced non-maliciously).

The problem with most configuration checkers is that they overwhelm the operator with problem reports, many of them of little or no significance. For example, one commercial configuration checker complains about root-owned system files that are writable by the owner. There are some obscure, theoretical situations where making such files non-writable would add protection. However, root, the super-user, is able to write to any file on the host, either immediately or after changing the permissions on the file. Another example: most configuration checkers complain about system files owned by system accounts other than root. Various vendors have distributed releases of their operating systems with files owned by the dedicated system accounts bin and sys. This is a problem if those files are writable through a network filesystem, because many of the common systems provide special handling only for root. However, the configuration checkers do not determine whether any of these enabling conditions are present before issuing warnings about this situation. If this weakness exists on a host, it typically applies to virtually all the system files, and hence the configuration checker issues pages upon pages of alerts.

The most time-consuming part of these configuration checkers is checking for weak user passwords. Initially, the attempts to crack the passwords involved trying just the most likely guesses (typically tens of items). Later, the approach shifted to retrieving a password file from a target host (by various means), and then trying to crack the passwords off-line. Working off-line allowed the attacker to apply more and more computing cycles to the cracking effort because they didn't have to worry about being detected. This "raised the bar" on what was regarded as a "weak" password, and in response, more resources had to be allocated to the password checking modules of the configuration checkers. With the password checking module requiring days to run, and the other modules requiring only minutes, this led to either splitting off the password checker, or making it an option (non-default).

In an embodiment of the invention, the system performs the same tests as the common configuration checkers, except for checking for weak passwords. However, most of the items identified are simply noted—recorded in the analysis engine's database, but not tagged as suspicious. In the normal operation of the user interface and report generator, these items are displayed only if they are part of a larger chain, thereby reducing the "clutter" factor that they introduce into traditional configuration checking systems.

The analysis engine uses items noted by the components corresponding to configuration checker modules as starting points to check for evidence indicating that that vulnerability may have been exploited.

Time Windows

To camouflage their activities, attackers often change the timestamps on the files they have changed, setting them back to the old timestamp. This disconnects the change to the contents from the time changed:
1) The system administrator will often look for files that have had their contents changed by using the indirect means of checking their last-modification dates for times:
   a) later than system installation time;
   b) in a time interval when he suspects a break-in may have occurred.
2) If the system administrator discovers a system file whose content indicates it was modified by an attacker, the last-modification date on the file does not provide information on when the attack occurred or what other files the attacker accessed and modified (by looking for timestamps close to the file that was known to be modified).

Some timestamps can be modified by programs, but the last-change time on files is set only by the kernel. To reset this timestamp, an attacker typically sets the system clock to the intended time, performs an operation that causes the kernel to update the last-change time to the current value of the system clock, and then resets the system clock back to the actual time. An alternative way to reset the last-change timestamp on a file is to access the disk as a raw device (disk blocks) instead of through the filesystem API. This is very rarely done because it is highly platform-specific (less portable) and requires much more complex programming.

The resetting of the system clock typically introduces a small amount of drift into the system clock. This is from a combination of effects, including granularity of clock value, granularity of clock updates, and variability in time used by system calls. Implementation of clocks is highly idiosyncratic, varying greatly between platforms.

In an embodiment of the invention, the intrusion detection system looks for discrepancies that arise from resetting the system clock. The sequence of three system calls (set clock backward, filesystem operation, set clock forward) provides an opportunity for the scheduler to give another job a timeslice within this sequence. If this other job writes an entry to a log file during this timeslice, and the time the attacker set is earlier than the preceding entry in the log, the log file will show a backward time step. The probability of this happening during one such time reset is small, but the typical attack involves changing multiple files, with multiple time reset, thereby increasing the chances of this happening. However, the probability of the clock being set to before the timestamp in the previous log entry is quite large, because the files that the attacker would typically change are system files that haven't been changed since installation (the "birth date" for that host—the earliest time any activity occurs). When the analysis engine of the invention finds a backwards time step, it makes two deductions:
1) High confidence that someone obtained root privilege and attempted to camouflage changes to the filesystem.
2) This happened in the time window bounded by the timestamps on the preceding and succeeding entries in the log file.

Backward time steps do occur legitimately to correct a clock that runs fast. If the system administrator corrects drift in the clock in a single step, rather than a incremental adjustment, the system utility that he would use writes a record to the wtmp log file. When the analysis engine finds such a record, it presents it to the operator for labeling on the range from legitimate to highly suspicious, and then propagates that value to related events. If the Network Time Protocol (NTP) is being used to keep the clock synchronized, the time adjustments are logged via syslog, and those entries are used to filter out any derivative backward time steps.

NTP provides two opportunities for catching someone resetting the system clock backwards. First, if the NTP update happens to occur during one of the attacker's resets, a large forward adjustment will be logged. Second, the introduced drift can cause a larger than expected adjustment. The analysis engine of the invention computes the expected drift and its standard deviations and labels adjustments with weighted distributions. There are two factors in the size of legitimate adjustments:
1) The drift of the system clock. This can often be treated as a constant factor over larger intervals, but in the shorter intervals, such as the NTP update cycle, the system clock can show variable drift rates that may be related to such things as system activity, temperature, and voltage level in the electronics.
2) Variability in accuracy of the time from the NTP server
   a) Variability in packet transmission time (e.g., network load)
   b) Drift on the server (packet transmission times affect higher stratum servers)

The analysis engine may also examine the database produced by the Filesystem Scanner sensor for directories with suspicious combinations of timestamps. A common situation arising from current attack tools and techniques is that a system directory will have a recent last-modification date, but all its files will appear to have been unchanged since installation. This results from the attacker linking and unlinking files to the directory and then using the technique described above to reset the times on the files. Because the attack patterns also have legitimate correlates, these suspicious combinations are marked with a moderate value, which can become a component of a highly suspicious sequence in a given time window In a further embodiment, directory and file timestamps from archival sources (e.g., backup tapes) may be used to extend the data used in the assessment of the current state of the filesystem.

Analysis Engine

Continuations are a basic concept in computer science. They are the representation of the state of a stopped process that allows the computation to be resumed (continued). There are many instantiations of the basic concept to support the requirements of a particular application. For example, on a multitasking operating system, processes and threads both allow interleaving of flow of control, both allowing the user of the processor to switch from a computation that has reached a point where it can no longer proceed (e.g., it is waiting for input from the user) to one that is ready to run. However, processes and threads are very different implementations of the concept of continuation. Processes are intended to be distinct objects, and "fairness" is typically the primary criteria controlling switching processor usage between processes. On the other hand, threads can have substantial interactions with other threads within the same process, and the major motivation for using them is to simplify the control flow of a program. Because of the difference in how threads and processes are used, threads must have a much lower overhead for switching (hence they are often called an instance of Light-Weight Processes).

Two categories of rule-based systems are those that use forward-chaining and those that use backward-chaining. Systems that use forward-chaining start with each incoming fact and generate all inferences resulting from the addition of that fact to the knowledge base, thereby producing all conclusions that are supported by the available facts. Systems that use backwards-chaining start with a goal and search for facts that support that goal, producing a structure of subgoals. Both approaches have the potential for substantial over-generation: computing inferences that are never used (forward-chaining) or hypothesizing sub-goals for which there is no support (backward-chaining). The forward- and backward-chaining approaches are analogues of bottom-up and top-down parsing in compiler technology.

Because of the complexity of the data, an embodiment of the invention may use a hybrid approach in its analysis engine. Incomplete data presents serious difficulties for a backward-chaining. For example, it becomes impossible to falsify (discard) a sub-goal when any of the supporting data is not found. Similarly, for forward-chaining, missing data blocks the formation of needed inferences. The system of the invention uses forward chaining to generate inferences, but limits the length of the chains. The chains are limited to simple combinations that are easily found along a dimension; e.g., a linear sequence of events within a login session, or a sequence of attempted logins from the same host. Inferences that match sub-goals then trigger backwards chaining from that sub-goal's potential parents into other sub-goals. Backward chaining handles combining events that are more separated or of flexible ordering, and for postulating missing events.

In the backward-chaining, goals can succeed even if some of the supporting data is missing, but a cost is assigned to each missing data item, and this affects the score assigned to the goal. Different missing data items carry different costs: data that is quickly overwritten during normal usage of the host has a low cost, whereas something that would be difficult for the attacker to modify would have a high cost. Cost functions are assigned to each potential missing item, allowing the inclusion of parameters such as elapsed time and system load.

The component of the overall score affected by missing data is called the confidence or credibility factor because it measures how strongly the data supports the likelihood that the goal is in fact true. It can also be viewed as the inverse of the likelihood that the goal is false: evidence that the goal is false lowers the confidence (credibility) value. The confidence (credibility) value is also affected by the data that is present: data that can be associated with multiple goals will lower the confidence value for goals where it is a possible, but unlikely, component.

Another component of the score on a goal is its support. This is similar to a probability, but there currently is no statistical basis to the assignment of these values, so we avoid the term probability to avoid the implication. Data items that are highly specific to a particular goal increase its support value substantially; data items that are common to many goals have little, if any, effect on this value.

The third component of the score on a goal is its importance. The importance of a goal is not changed by its sub-goals and supporting data items, but modified by meta-rules: rules that help manage the scheduling of what goals to pursue by modifying the priorities of on goals based upon other goals. For example, if the goal of finding that the attacker acquired root privilege has been assigned high support and high confidence, a meta-rule de-prioritizes rules related to the attacker acquiring the privileges of lesser system accounts (e.g., bin, sys) because, for most purposes, the latter is subsumed by the former.

The inventive system uses a continuation-based approach to scheduling the pursuit of the various goals, with the goals scores used to choose the next one to be pursued. A continuation for a rule is a pointer to the next sub-goal to execute and the instantiated values of the rules arguments (some may yet be uninstantiated or undefined). An alternative approach to continuations for scheduling rule execution is to subdivide rules into small segments, each of which becomes a rule. This increase in the number of rules increases the complexity of the selection conditions for each rule, which thereby increases the computational cost of processing the rule set. The increased cost of the alternatives more than offsets the cost of using continuations as used in the inventive system. One alternative approach to this problem is to organize rules into a set of graphs, with the connections in the graph taking the place of variables used as semaphores. Representative of this approach is the Procedural Reasoning System (PRS). In PRS, the rules, called Acts, are "procedures" in the abstract sense, but not the computation sense. The PRS database includes both facts and Acts, allowing Acts to be used as facts by other Acts, called meta-Acts. The PRS execution engine monitors for facts being added to the database that would trigger a pending rule (component of an Act), chooses a rule to execute, and then updates the set of rules waiting to run (by following the links in the Act for the rule).

Continuations have a second value to the analysis engine in that they are used to reduce the resources required. One approach would be for the inventive system to collect data from all potential sources and then analyze the resulting data base. However, because the inventive system uses so many overlapping data sources, this can waste significant wall-clock time and processor cycles. Because there can be a noticeable delay between the request for data and its receipt, the analysis engine needs to be able to block the execution of a goal until that data is available. This is analogous to the operating system marking a process unready to run until an input operation is completed. However, in the inventive system, the situation is more complicated than in the operating system analogue where the blocking occurs only during system calls (transfers of flow-of-control from the application to the operating system). A goal may be said to be blocked waiting for data, when it is actually blocked waiting for a sub-goal to be achieved, and it is that sub-goal that is blocked waiting for data, either directly or indirectly. When a goal receives the data needed to satisfy its requirements, it notifies all its parent goals—between the time the goal initially blocked waiting for data, other goals may have postulated it as one of their subgoals. Goals can also be multiply instantiated—satisfied by different pieces of data. Hence, a goal can iteratively block and unblock as it receives a stream of data items.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A system for detecting intrusions on a host, comprising:
   a) a sensor for collecting information including events and timestamps from a logfile; and
   b) an analysis engine configured to identify a backward time step in the logfile by identifying a first entry for which an associated first log entry time is earlier in time than a second log entry time associated with a second log entry entered in the logfile prior to the first entry, determine that the backward time step is associated with an event, and assign a suspicion value to the event based at least in part on the backward time step.

2. The system as recited in claim 1, wherein the analysis engine is configured to identify a time step as forward if a timestamp of an entry in the logfile is later than an preceding entry in the logfile, and identify a time step as backward if a timestamp of an entry in the logfile is earlier than an preceding entry in the logfile.

3. The system as recited in claim 1, wherein the analysis engine is further configured to use expected activity level in a directory to determine the suspicion value.

4. The system as recited in claim 1, further comprising a second sensor for collecting information including events and timestamps from a second logfile.

5. The system as recited in claim 4, wherein the analysis engine is configured to correlate a time step in the logfile with an event in the second logfile.

6. The system as recited in claim 1, wherein the analysis engine is further configured to filter out expected time steps from further analysis.

7. The system as recited in claim 6, wherein the analysis engine is configured to filter out expected backward time steps by correlating them to Network Time Protocol adjustments.

8. The system as recited in claim 6, wherein the analysis engine is further configured to compute an expected time drift resulting from a Network Time Protocol adjustment, and compare a forward time step in the logfile with the expected time drift.

9. The system as recited in claim 8, wherein the analysis engine is further configured to compute a standard deviation of the expected time drift.

10. The system as recited in claim 9, wherein the analysis engine is further configured to label time steps with weighted distributions.

11. The system as recited in claim 1, further comprising a user interface, and wherein the analysis engine is configured, upon correlating a time step to a record of an event in a logfile, to present the record to a user for labeling as to suspicion value.

12. The system as recited in claim 11, wherein the analysis engine is further configured to propagate the suspicion value to related events.

13. A method for detecting intrusions on a host, comprising the steps of:
   a) collecting information including events and timestamps from a logfile;
   b) identifying a backward time step in the logfile by identifying a first entry for which an associated first log entry time is earlier in time than a second log entry time associated with a second log entry entered in the logfile prior to the first entry;
   c) determining that the backward time step is associated with an event; and
   d) assigning a suspicion value to the event based at least in part on the backward time step.

14. A computer program product for detecting intrusions on a host, the computer program product being embodied in a computer readable medium having machine readable code embodied therein for performing the steps of:
   a) collecting information including events and timestamps from a logfile;
   b) identifying a backward time step in the logfile by identifying a first entry for which an associated first log entry time is earlier in time than a second log entry time associated with a second log entry entered in the logfile prior to the first entry;
   c) determining that the backward time step is associated with an event; and
   d) assigning a suspicion value to the event based at least in part on the backward time step.

* * * * *